United States Patent
Andoh et al.

[11] Patent Number: 6,031,633
[45] Date of Patent: Feb. 29, 2000

[54] CONTROL METHOD OF SCANNER OPTICAL SYSTEM OF ORIGINAL IMAGE READING APPARATUS, MOTOR CONTROL DEVICE AND MOVING UNIT DRIVING DEVICE OF IMAGE READING APPARATUS

[75] Inventors: Toshiyuki Andoh, Kanagawa; Mikio Kamoshita, Tokyo; Minoru Takahashi; Tomiko Takahashi, both of Kanagawa, all of Japan

[73] Assignee: Ricoh Company, Ltd., Tokyo, Japan

[21] Appl. No.: 08/892,065

[22] Filed: Jul. 14, 1997

[30] Foreign Application Priority Data

Jul. 17, 1996 [JP] Japan .................................. 8-187575

[51] Int. Cl.[7] ........................................... H04N 1/36
[52] U.S. Cl. ........................... 358/412; 358/419; 358/421
[58] Field of Search ............................... 358/400, 401, 358/474, 409, 412, 413, 420, 421, 422, 486, 494, 496, 497, 419

[56] References Cited

U.S. PATENT DOCUMENTS 5,404,206  4/1995  Andoh et al. ........................... 355/235
5,610,721  3/1997  Higuchi .................................. 358/409
5,805,208  9/1998  Meierdiercks .......................... 348/97

FOREIGN PATENT DOCUMENTS 2-232641  9/1990  Japan .
5-22975   1/1993  Japan .

*Primary Examiner*—Jerome Grant, II
*Attorney, Agent, or Firm*—Oblon, Spivak, McClelland, Maier & Neustadt, P.C.

[57] ABSTRACT

An original image reading apparatus comprises an exposure optical system including a scanner optical system which can perform go and return operations, a scanner driving motor which drives said scanner optical system, velocity detecting means for detecting a moving velocity of said scanner optical system and position detecting means for detecting the position of said scanner optical system. In the apparatus, return control is performed which is control of returning said scanner optical system after an original image reading scan has been finished. A target velocity is calculated from a residual distance from a current position of said scanner optical system to a target reference position. Target acceleration is used as feedforward. Velocity control is performed so that detected velocity follows the target velocity.

16 Claims, 25 Drawing Sheets

CONTROL METHOD OF SCANNER OPTICAL SYSTEM OF ORIGINAL IMAGE READING APPARATUS, MOTOR CONTROL DEVICE AND MOVING UNIT DRIVING DEVICE OF IMAGE READING APPARATUS

BACKGROUND OF THE INVENTION

1. Field of the Invention

The present invention relates to a control method of a scanner optical system of an original image reading apparatus, and in detail, to a method of return control, that is, control of returning a scanner to a reference position after original image reading scanning has been finished. Further, the present invention relates to a motor control device and a carriage driving device of an image reading apparatus.

2. Description of the Related Art

FIGS. 1A and 1B show a general arrangement in one example of an original image reading apparatus to which the present invention is applied. FIG. 1A shows a general side elevational view and FIG. 1B shows a general perspective view. As it is well known, an exposing optical system including a scanner optical system 2 is provided below a contact glass 1 on which an original image sheet is placed. Thereby, reflected light from the original image sheet is used for forming an image on a drum-shaped light sensitive body 3. The scanner optical system 2 includes a first scanner 7 including a light source 4, a reflecting plate 5, a first mirror 6 and a second scanner 10 including second and third mirrors 8 and 9. The exposing optical system is formed by the scanner optical system 2, an image forming lens 11 fixed to the apparatus body, a fourth mirror 12 and so forth. A dustproof glass 13 is provided. The first scanner 7 and the second scanner 10 are driven by a driving motor 14 via a wire 15. In the apparatus body, a scanner home position sensor (hereinafter referred to as 'HP sensor') is provided. The HP sensor 16 acts as reference position detecting means of the scanner optical system 2 and is of a reflection photosensor. A covering plate 17 for covering the HP sensor 16 is provided to the first scanner 7.

In the above-described arrangement, the first and second scanners 7 and 10 of the scanner optical system 2 start from a home position shown by solid lines in FIG. 1A and are driven rightwardly so as to expose and scan a surface of the original image sheet. After the scanner optical system 2 has finished the exposing and scanning, the first and second scanner 7 and 10 are at positions shown by chain double-dashed lines in FIG. 1A. This position varies depending on a size of an original image sheet. Return control is performed on the scanner optical system 2 which has finished the exposing and scanning so that the scanner optical system 2 is returned to the home position for a subsequent exposing and scanning.

In such an original image reading apparatus performing going and returning operations, when performing the going operation for exposing and scanning an original image sheet, fine velocity control is performed for preventing degradation of reading image quality. However, when performing the returning operation for returning the scanner optical system to the reference position (home position) for a subsequent original image exposing and scanning, the return control is performed wherein, in order to reduce the scanner moving time, the scanner optical system is driven with full power and braking is performed at a predetermined position, for example.

For example, in the art disclosed in Japanese Laid-Open Patent Application 2-232641, acceleration is performed using a predetermined returning velocity as a target velocity. Then, after reaching a predetermined position, deceleration is performed using a returning velocity obtained from a predetermined calculation equation or data table as a target velocity. An image scanning system is driven at various scanning velocities for various scanning distances depending on the size of an original image sheet or the size of a copy sheet. Accordingly, a plurality of calculation formulas and data tables are prepared and appropriate ones are selected therefrom according to a particular situation. Further, when the velocity of the scanner optical system varies with respect to the target velocity, the predetermined position at which velocity control is changed to deceleration control is appropriately changed. Specifically, the moving velocity and the position (moving distance) of the reading unit are detected, errors between the target velocity and detected velocity are calculated and a proportional integral control operation is performed.

However, in the above-described methods, in order to reduce the returning time, the scanner optical system is accelerated to high velocity. Thereby, when the scanner optical system is decelerated, appropriate deceleration may not be performed. As a result, the scanner optical system may not be stopped at the home position, and vibration and noise may occur.

Japanese Laid-Open Patent Application No. 5-22975 discloses a motor drive control method and apparatus. In the method and apparatus, when performing motor deceleration control, target angular velocity ω of a motor in deceleration is obtained as follows:

$$\omega = \sqrt{2\alpha\Theta}$$

where Θ represents the angle which the motor rotates until the motor stops, and α represents the absolute value of an angular acceleration at the deceleration. Thus, the motor is decelerated at the fixed angular acceleration.

Although it is not disclosed in Japanese Laid-Open Patent Application No. 5-22975, in order to perform high-speed control, a high-voltage (for example, 38 V) power source is needed, and, in order to perform stable control, ordinarily current control is performed. Accordingly, a current sensor is needed specially for this purpose. As a result, the control system is expensive.

Further, in the art of Japanese Laid-Open Patent Application No. 5-22975, when performing motor deceleration control, target angular velocity ω of a motor in deceleration is obtained as follows:

$$\omega = \sqrt{2\alpha\Theta}$$

where Θ represents the angle which the motor rotates until the motor stops, and α represents the absolute value of an angular acceleration at the deceleration. Thus, the motor is decelerated at the fixed angular acceleration. However, there is no disclosure of a method of determining the angular acceleration at the deceleration.

SUMMARY OF THE INVENTION

An object of the present invention is to eliminate velocity errors as a result of controlling the angular velocity to follow a target velocity at acceleration and adding a target angular acceleration as feedforward to the control system, and also to eliminate vibration and to eliminate noise of the apparatus when the scanner optical system stops as a result of controlling acceleration so that velocity variation is gentle at a position near the stop position.

A control method of a scanner optical system of an original image reading apparatus, according to the present invention, the apparatus comprising an exposure optical system including a scanner optical system which can perform go and return operations, a scanner driving motor which drives the scanner optical system, velocity detecting means for detecting a moving velocity of the scanner optical system and position detecting means for detecting the position of the scanner optical system, comprises the step of return control which is control of returning the scanner optical system after an original image reading scan has been finished, and the step of return control comprises the following steps of:

calculating a target velocity from a residual distance from a current position of the scanner optical system to a target reference position;

using target acceleration as feedforward; and performing velocity control so that a detected velocity follows the target velocity.

Thereby, even if a gain is too high, vibration or the like due to mechanical resonance does not occur, and, without excessively increasing the gain, good velocity control without steady-state deviation can be enabled.

The control method may comprise steps of:

recognizing a moving distance from an original image sheet size, copy magnification and so forth;

obtaining the maximum velocity from acceleration determined from the moving distance and a mechanical performance of a scanner optical system driving system, and from a reference position plunge velocity; and calculating acceleration, a constant velocity state and deceleration switching over positions.

Thereby, an appropriate target velocity profile can be obtained according to conditions such as the original image sheet size.

The control method may be that the maximum velocity is a predetermined rate of a calculated maximum velocity which is calculated from the acceleration determined from the moving distance and mechanical performance, and the reference position plunge velocity.

Thereby, it is possible to provide a velocity constant portion so that, by appropriately changing deceleration starting timing, influence of variation of velocity can be canceled out. Accordingly, it is not necessary to prepare a plurality of target velocity calculating equations or data tables for good velocity control according various conditions.

The control method may be that the absolute value of acceleration in deceleration in the return control is switched over to a smaller value at a predetermined position near to a stop position.

Thereby, it is possible to reduce the absolute value of acceleration in deceleration when the scanner optical system stops. Accordingly, it is possible to reduce vibrations and a position error at the stopping.

The control method may be that a smooth profile of acceleration in deceleration is used from a predetermined position in deceleration of the return control.

Thereby, it is possible that the absolute value of acceleration in deceleration gradually decreases and is 0 or a very small value at the stopping. Accordingly, it is possible to reduce vibrations and a position error at the stopping.

The control method may be that a friction force occurring from the construction of a scanner optical system driving system is converted into an acceleration which is added to the target acceleration of the feedforward.

Thereby, it is possible to cancel out the influence of the friction force. Accordingly, good velocity control without steady-state deviation can be enabled.

Another object of the present invention is provide a motor control device in which stable control is possible without using a current sensor specially designed for current control even when a high-voltage power source is used. Another object of the present invention is to provide a method of determining acceleration in deceleration and to provide a stable control device, considering initial errors and variations of the motor torque constant, voltage constant and the motor resistance value.

For a carriage driving device in an image reading apparatus, accurate, high-speed and stable return control is required. Another object of the present invention is to provide a carriage driving device of an image reading apparatus in which accurate, high-speed and stable return control can be achieved as a result of using the above-mentioned motor control device in the return control of the sub-scan carriage of the image reading apparatus.

A motor control device according to the present invention, is a motor driving control device for controlling motor angular velocity in trapezoid driving for rotating the motor a predetermined angle, wherein:

a target angular velocity $\omega$ in deceleration is $\sqrt{2\alpha\Theta}$ where $\Theta$ represents the rotation angle until the motor stops and $\alpha$ represents the absolute value of acceleration in deceleration, the motor control device is a motor control device of a current driving system in which a current flowing through the motor is controlled, only the absolute value of the current flowing through the motor is detected, and a current feedback loop is formed, sequential control of a motor rotation angle according to the trapezoid driving is performed, in deceleration, when actual angular velocity is lower than target angular velocity, a motor input voltage is to be 0, and in a velocity constant state or in acceleration and the velocity constant state, when actual angular velocity is higher than target angular velocity, a motor input voltage is to be 0.

Thereby, it can be prevented that the motor current is reversed contrary to the control sequence. Further, even if a high-voltage power source is used, stable current feedback control based on current detection using the current detecting resistor, operational amplifier and so forth can be achieved, and an inexpensive control system can be achieved.

The motor control device may be that:

a graph is produced in which one axis represents acceleration in deceleration and the other axis represents errors with respect to a design value of the torque constant or the voltage constant of a motor, and the trapezoid control possible range is obtained in the graph, and acceleration in deceleration is obtained for which the entirety of a given error range with respect to the design value of the torque constant or the voltage constant of the motor is included in the trapezoid control possible range, the obtained acceleration in deceleration being actually used.

Thereby, even if change of the torque constant or voltage constant of the motor occurs, it is possible to determine acceleration in deceleration which enables stable control.

The motor control device may be that the given error range with respect to the design value of the torque constant or the voltage constant of the motor is 0%.

Thereby, the acceleration in deceleration in the design value is determined, the stable control device in the design value can be provided, and it is possible to reduce a time required for producing the control device.

The motor control device may be that:

a graph is produced in which one axis represents acceleration in deceleration and the other axis represents errors with respect to a design value of the torque constant or the voltage constant of a motor, and the trapezoid control possible range is obtained in the graph, previously the torque constant or the voltage constant of the motor is measured, and acceleration in deceleration is obtained for which the entirety of a given error range with respect to the measured value of the torque constant or the voltage constant of the motor is included in the trapezoid control possible range, the obtained acceleration in deceleration being actually used.

Thereby, even if there is a large initial error of the torque constant or voltage constant of the motor, because this error and also change of the torque constant or voltage constant of the motor from the initial error due to time elapsing in use of the control device are considered for determining acceleration in deceleration to be used, a stable control device can be provided.

The motor control device may be that the given error range with respect to the measured value of the torque constant or the voltage constant of the motor is 0%.

Thereby, the acceleration in deceleration in the measured value of the torque constant or the voltage constant of the motor is determined, the stable control device in the design value can be provided, and it is possible to reduce a time required for producing the control device.

The motor control device may be that:

a graph is produced in which one axis represents acceleration in deceleration and the other axis represents errors with respect to a design value of the torque constant or the voltage constant of a motor, and the lower limit or the upper limit of the trapezoid control possible range is obtained in the graph, and acceleration in deceleration for the design value of the torque constant or the voltage constant of the motor is obtained based on the line of the lower limit or upper limit, and the obtained acceleration in deceleration is actually used.

Thus, it is possible to immediately determine the acceleration in deceleration for the design value of the torque constant or the voltage constant of the motor, without need of selection, by which stable control can be performed.

The motor control device may be that the lower limit or upper limit is stored as a table. Thereby, it is possible to search for and set in the device acceleration in deceleration for the design value or the measured value of the torque constant or the voltage constant of the motor The motor control device may be that:

a graph is produced in which one axis represents acceleration in deceleration and the other axis represents errors with respect to a design value of the torque constant or the voltage constant of a motor, and the lower limit or the upper limit of the trapezoid control possible range is obtained in the graph, previously the torque constant or the voltage constant of the motor is measured, and acceleration in deceleration for the measured value of the torque constant or the voltage constant of the motor is obtained based on the line of the lower limit or upper limit, and the obtained acceleration in deceleration is actually used.

Thus, even if there is a large initial error of the torque constant or voltage constant of the motor, it is possible to immediately determine the acceleration in deceleration for the design value of the torque constant or the voltage constant of the motor, without need of selection, by which stable control can be performed.

In a moving unit driving device of an image reading apparatus according to the present invention, the device uses, for return control of a sub-scan moving unit of the image reading apparatus, a motor control device, which is a motor driving control device for controlling motor angular velocity in trapezoid driving for rotating the motor a predetermined angle.

Target angular velocity $\omega$ in deceleration is $\sqrt{2\alpha\Theta}$ where $\Theta$ represents the rotation angle until the motor stops and $\alpha$ represents the absolute value of acceleration in deceleration, the motor control device is a motor control device of a current driving system in which a current flowing through the motor is controlled, only the absolute value of the current flowing through the motor is detected, and a current feedback loop is formed, sequential control of motor rotation angle according to the trapezoid driving is performed, in deceleration, when actual angular velocity is lower than target angular velocity, a motor input voltage is to be 0, and in a velocity constant state or in acceleration and the velocity constant state, when actual angular velocity is higher than target angular velocity, a motor input voltage is to be 0.

Thereby, it is possible to provide the moving unit driving device of the image reading apparatus in which the high-speed, precise and stable return control can be enabled.

In a moving unit driving device of an image reading apparatus according to the present invention, the device uses, for return control of a sub-scan moving unit of the image reading apparatus, a motor control device.

A graph is produced in which one axis represents acceleration in deceleration and the other axis represents errors with respect to a design value of the torque constant or the voltage constant of a motor, and the lower limit or the upper limit of the trapezoid control possible range is obtained in the graph, previously the torque constant or the voltage constant of the motor is obtained in a pre-scan of the image reading apparatus, and acceleration in deceleration for the measured value of the torque constant or the voltage constant of the motor is obtained based on the line of the lower limit or upper limit, and the obtained acceleration in deceleration is actually used.

Thereby, it is possible to provide the moving unit driving device of the image reading apparatus in which the high-speed, precise and stable return control considering change of the torque constant or the voltage constant of the motor can be enabled.

Other objects and further features of the present invention will become more apparent from the following detailed description when read in conjunction with the accompanying drawings.

DETAILED DESCRIPTION OF THE PREFERRED EMBODIMENTS

Figure 1A:
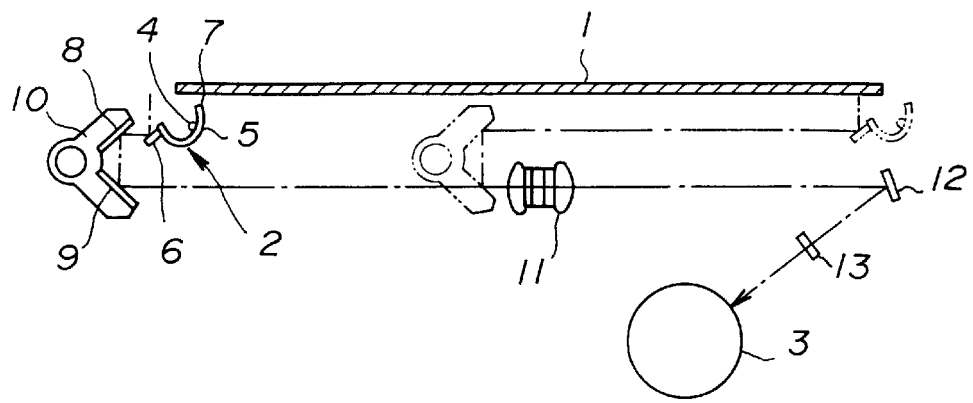
FIGS. 1A and 1B show an example of an original image reading apparatus to which the present invention is applied.
Figure 1B:
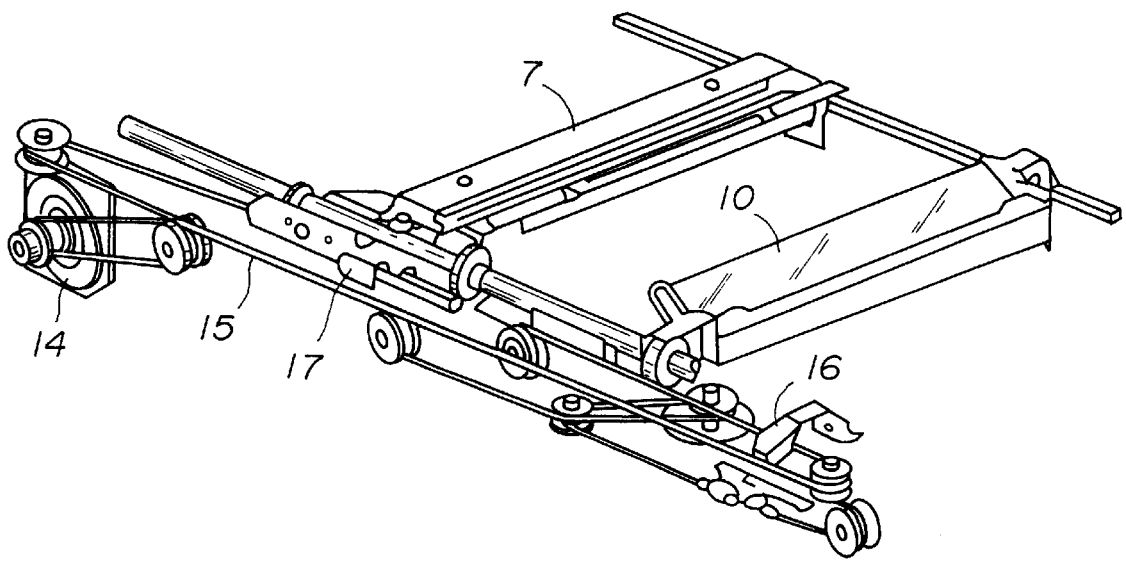
Figure 2:
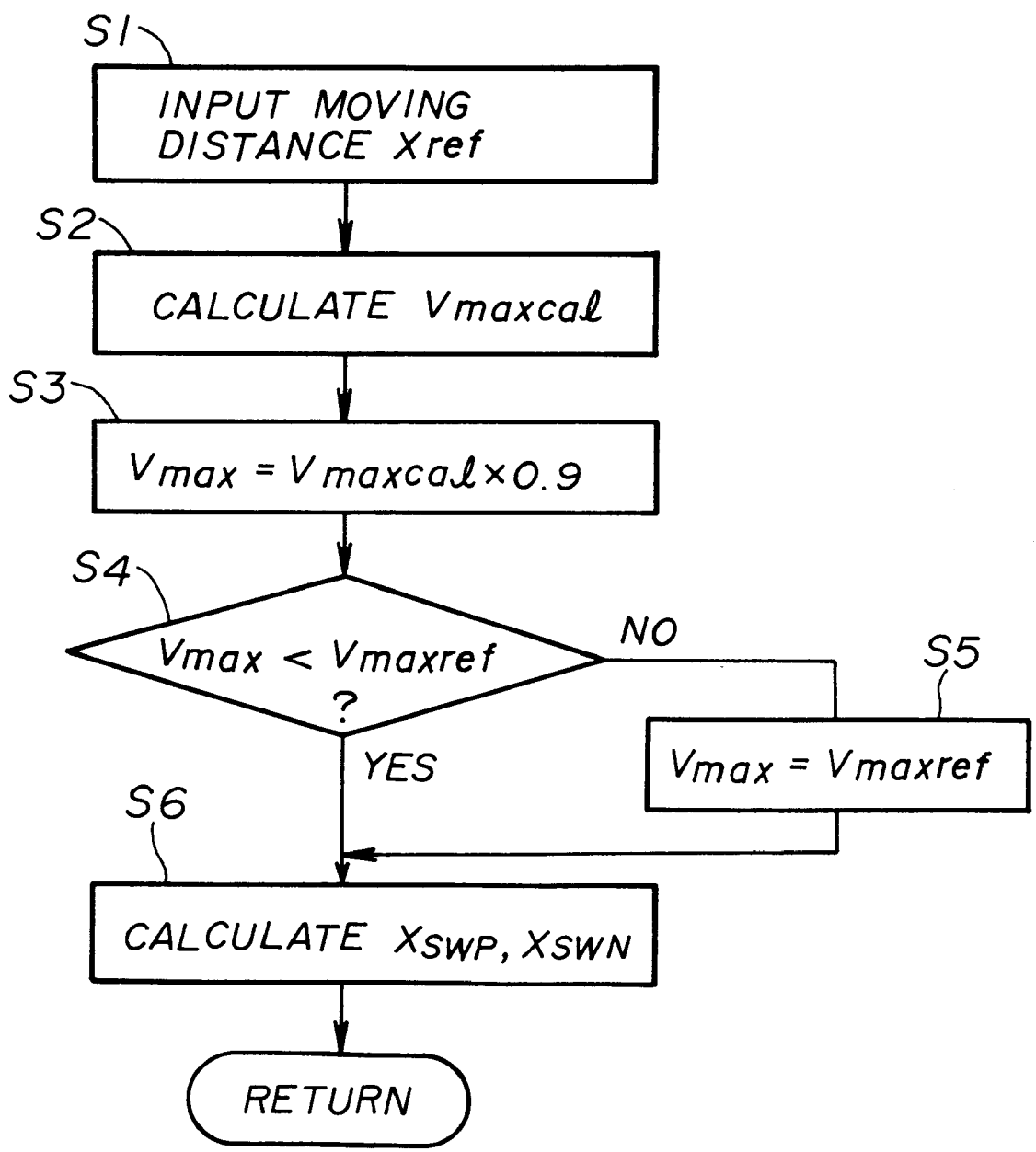
FIG. 2 shows a flowchart for illustrating a control flow (initial setting) in a first embodiment of the present invention.

FIG. 2 shows an operation flowchart (initial setting) for illustrating a return control portion in a first embodiment of the present invention. First, the size of an original image sheet is recognized so that a moving distance Xref of the above-mentioned first scanner 7 shown in FIGS. 1A, 1B is determined in a step S1 (hereinafter, the term 'step' being omitted). The moving distance varies depending on the size of the original image sheet. In S2, from an acceleration determined from the moving distance and the arrangement of the carriage and so forth (mechanical performance), and the home position plunge velocity, a maximum velocity Vmaxcal in this condition is calculated. In S3, 90% of the calculated maximum velocity Vmaxcal is used as maximum velocity Vmax which is used for calculating mode switching over positions. The rate 90% is not limited to 90%. This rate can be arbitrarily determined. This rate may be 80% or 95%, for example. The maximum velocity Vmaxref which is possible in consideration of the performance of the scanning mechanism is predetermined. In S4, it is determined whether or not the maximum velocity Vmax exceeds the maximum velocity Vmaxref. If the maximum velocity Vmax exceeds the maximum velocity Vmaxref, the maximum velocity Vmaxref is used as the maximum velocity Vmax used for calculating the mode switching over positions, in S5. In S6, from the maximum velocity Vmax, an acceleration and moving distance, an acceleration, velocity constant and deceleration switching over positions $X_{SWP}$ and $X_{SWN}$ are determined.

Figure 3:
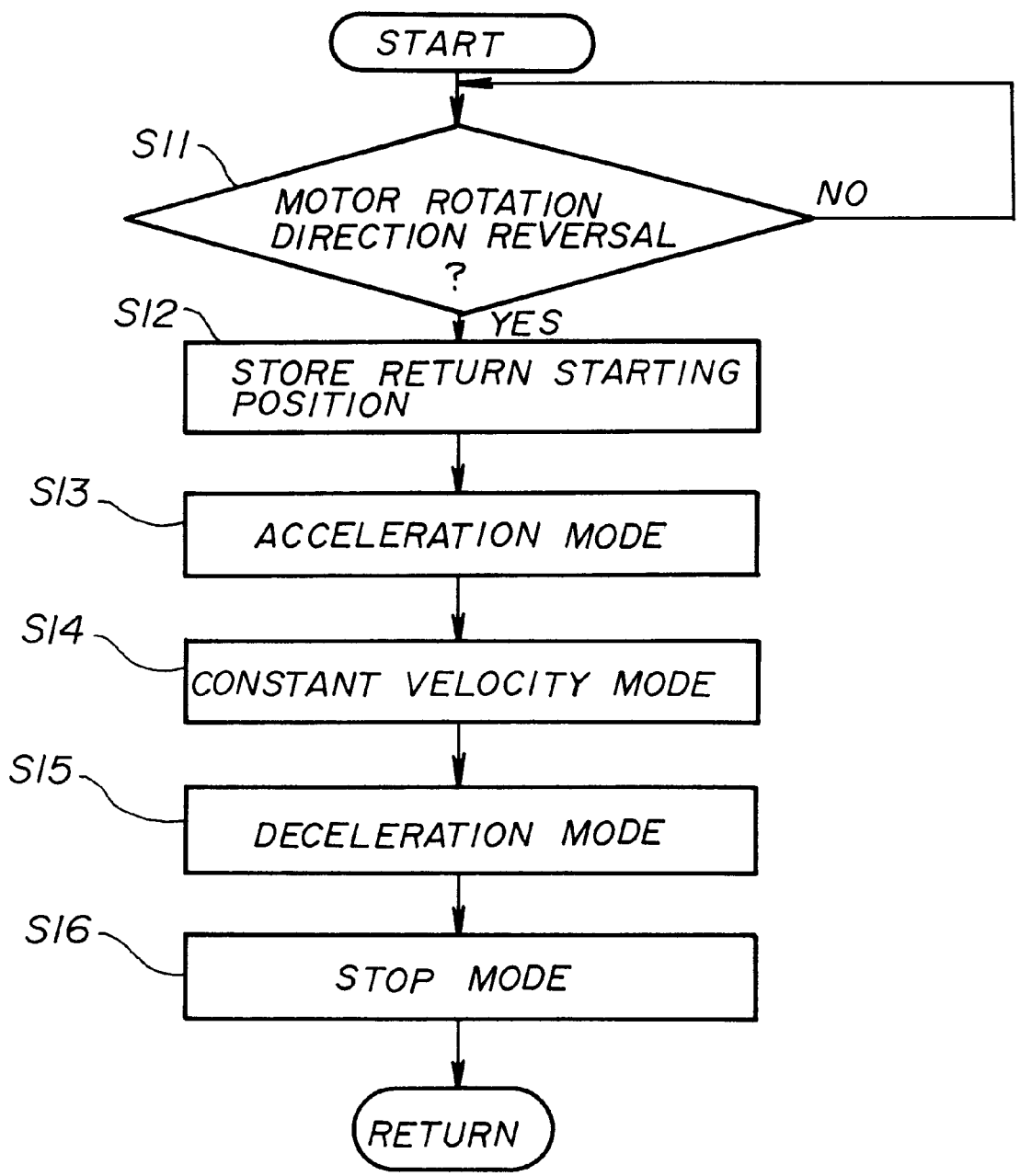
FIG. 3 shows a flowchart for illustrating a control flow (return control) in the first embodiment of the present invention.

FIG. 3 shows an operation flowchart of a control flow (return). First, the scanner optical system starts exposing and scanning an original image sheet, and the first scanner 7 moves for the recognized moving distance (the size of the original image sheet). When the exposing and scanning has been finished, control operation is changed from original image sheet exposing and scanning main program control to return control. Simultaneously, in order to stop the scanner optical system, a braking voltage is applied to the scanner optical system driving motor.

In the return control for which various constants are initially set as described above with reference to FIG. 2, starting of the return control after the original image sheet exposing and scanning have been finished and reversal of the rotation direction of the motor are waited for, in S11. After the scanner optical system has stopped, the stopped position of the scanner optical system (specifically, the first scanner 7) is stored in S12, and the return control is started. The return control is divided into an acceleration mode (S13), a velocity constant mode (S14), a deceleration mode (S15) and a stop mode (S16).

Figure 4:
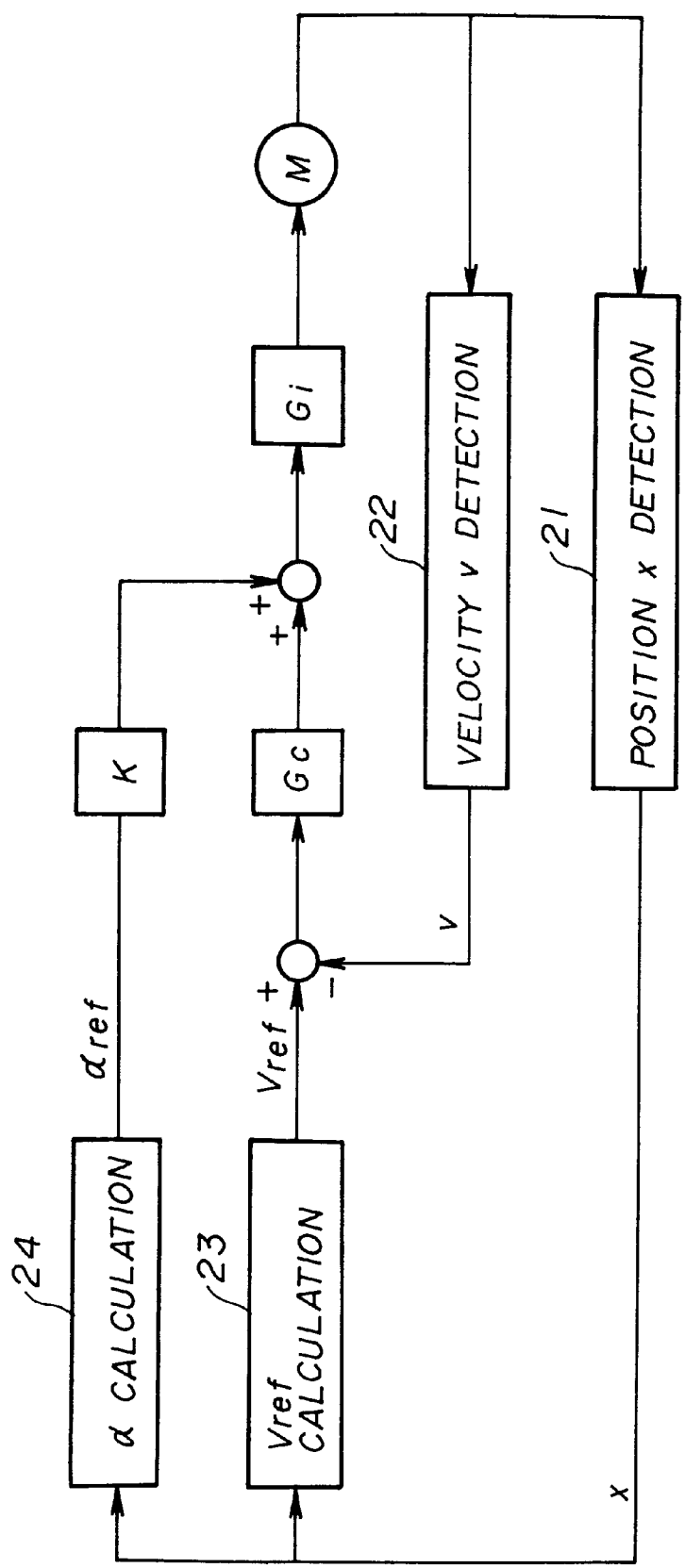
FIG. 4 shows a block diagram of an arrangement for achieving the control flow shown in FIG. 3.
Figure 5:
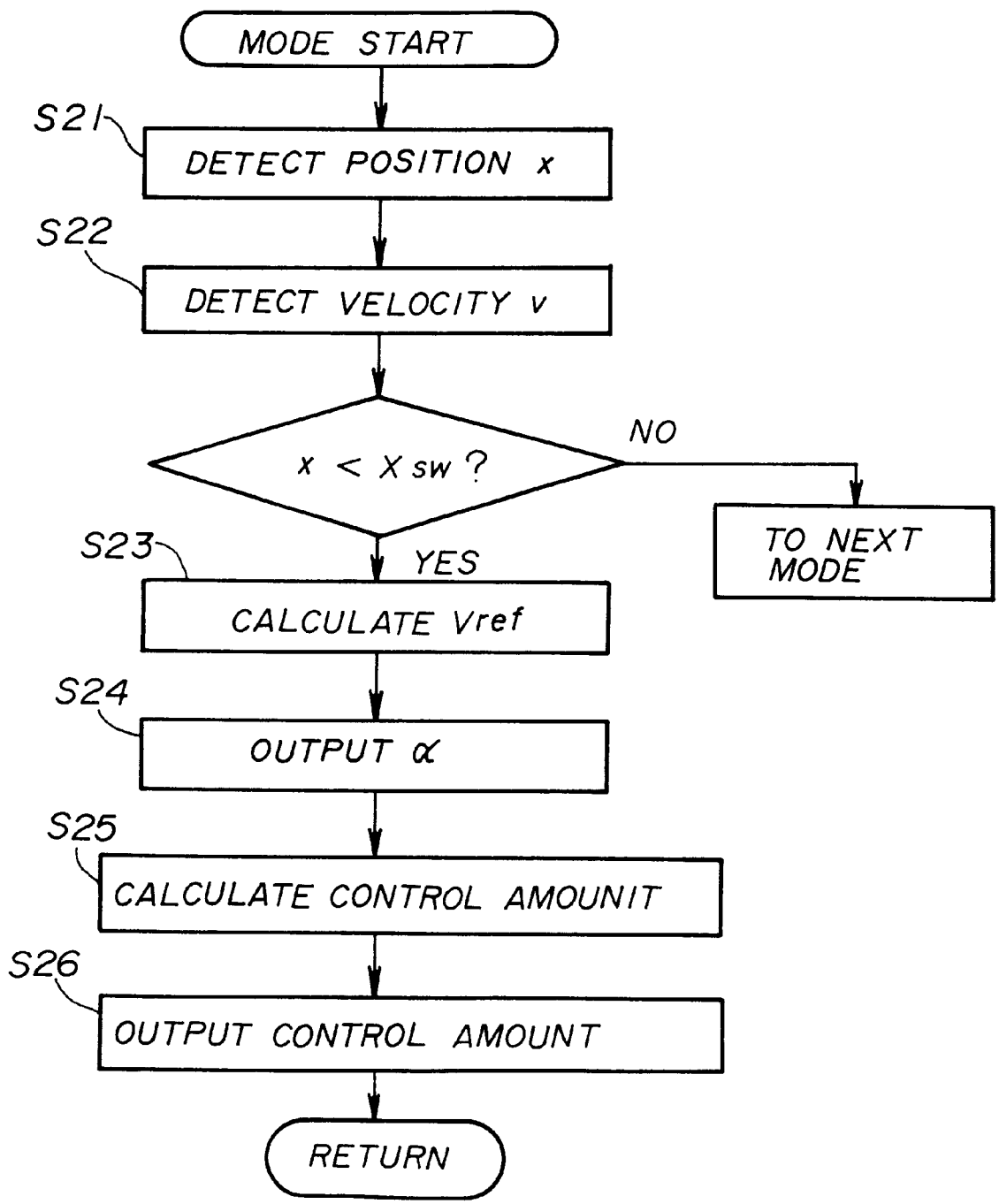
FIG. 5 shows a control flow diagram for illustrating each portion of the arrangement shown in FIG. 4.

FIG. 4 shows a block diagram arranged according to an operation flow of the present invention. FIG. 5 shows a control flow of each mode. In S21 and S22, the position and velocity of the scanner optical system (specifically, the first scanner 7) are detected by a position x detecting portion 21 and a velocity v detecting portion 22. The velocity may be directly detected, and, instead, the velocity may be calculated from the position. In the acceleration mode, until the detected position reaches an initial predetermined position, the target velocity is a preset initial value. This is because, for example, a rotary encoder is used as position detecting means, a precise value cannot be obtained at the first pulse of the rotary encoder, and erroneous movement of the scanner optical system may occur when using such a non-precise value. When the detected position is smaller than the mode switching over position, the target velocity is calculated in S23 by a target velocity Vref calculating portion 23. The target velocity may be obtained from using a calculation formula for calculating the target velocity, which formula is previously stored, and calculating the target velocity using the detected position. Instead, the target velocity may be obtained from using a data table provided for detected positions and reading the target velocity from the data table. In S24, by an acceleration calculating portion 24, an acceleration is set for the current mode. A control amount is calculated from feedforward of the acceleration and feedback of the velocity in S25. In S26, the calculated control amount is output.

Figure 6:
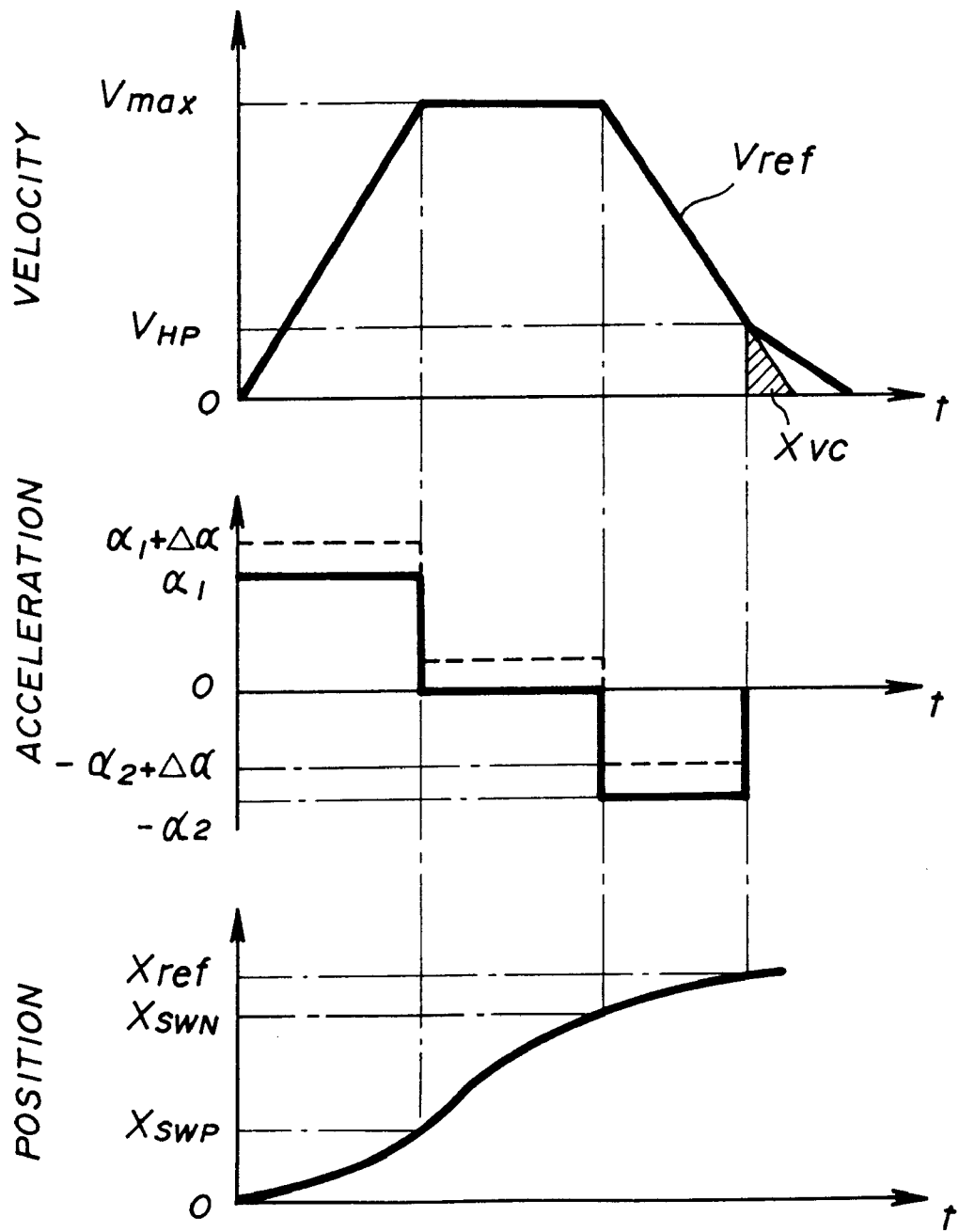
FIG. 6 illustrates one example of target velocity setting.
Figure 7:
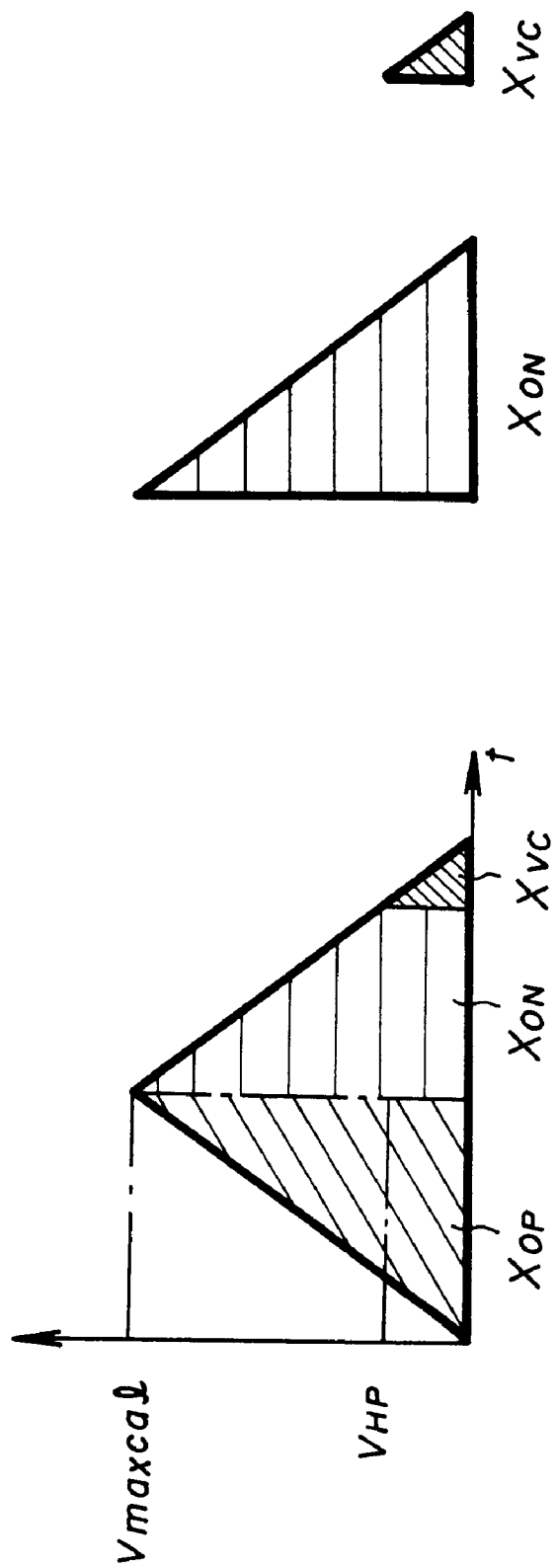
FIG. 7 illustrates a maximum velocity Vmax determining method.

FIG. 6 illustrates one example of the target velocity. The following equations are basic equations of the target velocity:

Vref(acceleration)=$\sqrt{2\alpha X}$; and

Vref(deceleration)=$\sqrt{2\alpha'(X_0-X)}$.

where $X_0$ represents the entire moving distance, α represents the acceleration, α' represents the absolute value of the acceleration in deceleration and X represents the position (distance moved).

As shown in FIG. 6, the scanner optical system (specifically, the first scanner 7) is accelerated at the acceleration +$\alpha_1$ until the first scanner 7 reaches the velocity constant switching over position $X_{SWP}$. When the first scanner 7 reaches $X_{SWP}$, the velocity of the first scanner 7 becomes the maximum velocity Vmax. Then, until the first scanner 7 reaches the deceleration switching over position $X_{SWN}$, the velocity of the first scanner 7 is controlled to be fixed. Then, the first scanner 7 is decelerated at the acceleration −$\alpha_2$ until the first scanner 7 moves the target moving distance Xref. When the first scanner 7 has moved the target moving distance Xref, the velocity of the first scanner 7 is the home position plunge velocity $V_{HP}$, and the braking voltage is applied to the scanner optical system driving motor. Thereby, the scanner optical system stops.

The maximum velocity Vmax and each mode switching over position are calculated from the target moving distance and the accelerations.

Because the target velocity becomes the home position plunge velocity $V_{HP}$ when the first scanner 7 moves the target moving distance Xref, the entire moving distance $X_0$ used for calculating the target velocity is obtained from adding $X_{VC}$ indicated by oblique-line hatching in FIG. 6 to the target moving distance Xref. Assuming that a moving distance during acceleration is $X_{OP}$, a moving distance during deceleration is $X_{ON}$ and a moving distance from when the velocity of the first scanner 7 is at $V_{HP}$ until the first scanner 7 stops is $X_{VC}$, the maximum velocity Vmaxcal calculated in the condition will be as shown below. It is assumed that the maximum velocity Vmax used for calculating the mode switching over positions is 90% of the calculated maximum velocity Vmaxcal. When the maximum velocity Vmax is larger than the maximum velocity Vmaxref determined in consideration of the performance of the scanning mechanism, Vmaxref is used as Vmax (as shown in FIG. 2).

From the maximum velocity Vmax and the accelerations α, the mode switching over positions $X_{SWP}$ and $X_{SWN}$ are calculated as follows:

$$X_{VC} = \frac{V_{HP}^2}{2an},$$

$$X_{OP} = \frac{an}{aa + an}(Xref + X_{VC}),$$

$$Vmaxcal = \sqrt{2aa X_{OP}},$$

$$Vmax = 0.9 Vmaxcal,$$

$$X_{SWP} = \frac{V_{max}^2}{2aa},$$

$$X_{SWN} = X_{ref} + X_{VC} - \frac{V_{max}^2}{2an},$$

where 'aa' represents an acceleration at acceleration and 'an' represent the absolute value of an acceleration in deceleration.

Thus, for any moving distance, optimum maximum velocity and each mode switching over position can be obtained, and velocity control can be performed with optimum target velocity.

Further the maximum velocity used for calculating each mode switching over position is 90% or the like of the maximum velocity calculated under the condition and the velocity constant mode is provided. Thereby, even if there is fluctuation in velocity of the scanner optical system, any error occurring due to the fluctuation can be canceled by adjusting the time of the velocity constant mode. As a result, the final stop position of the scanner optical system is fixed.

The accelerations indicated by solid lines in FIG. 6 are accelerations without considering the influence of friction in the scanning mechanism. The accelerations indicated by broken lines in the figure are accelerations considering the influence of friction in the scanning mechanism. By using the accelerations indicated by broken lines, it is possible to cancel the influence of friction, to eliminate steady-state deviation and thus good control can be performed.

Figure 8:
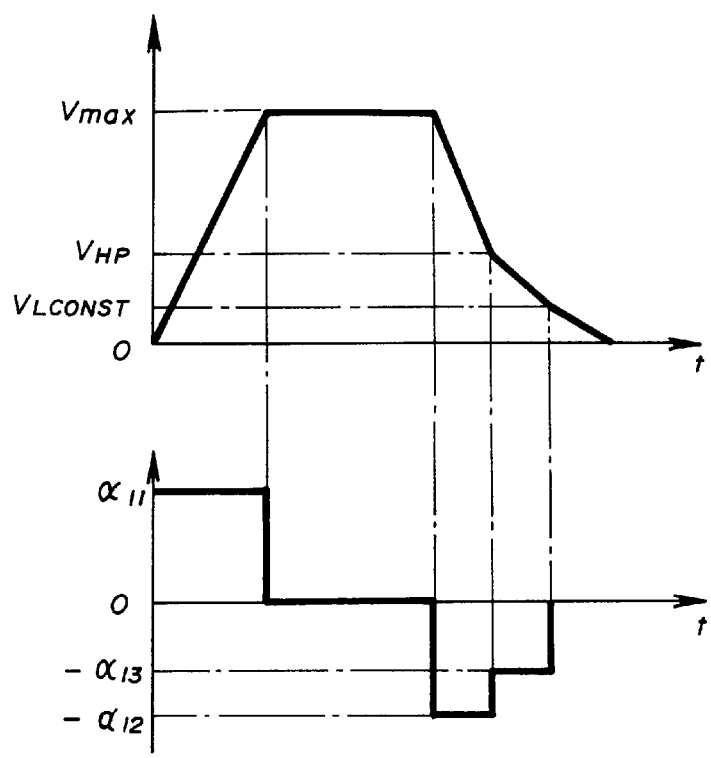
FIG. 8 illustrates a way to decelerate at stopping.
Figure 9:
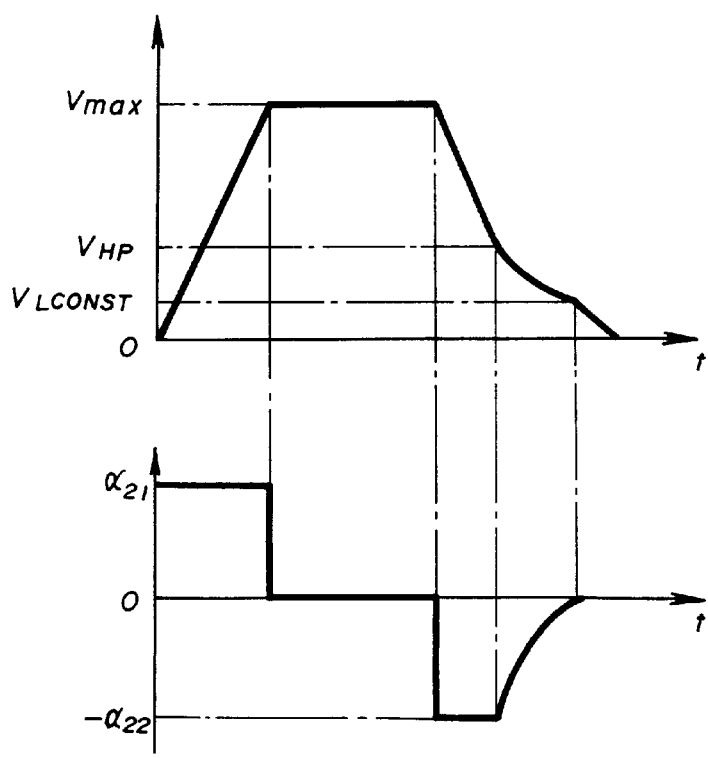
FIG. 9 illustrates another way to decelerate at stopping.

In the example of FIG. 6, the braking voltage is applied to the scanner optical system driving motor when the velocity of the first scanner 7 is the home position plunge velocity $V_{HP}$. However, instead, it is also possible that, as shown in FIG. 8, during change of the velocity of the first scanner 7 from $V_{HP}$ to a predetermined velocity $V_{LCONST}$, the velocity of the scanner optical system is controlled so that the absolute value of the acceleration of the first scanner 7 is smaller. Then, when the velocity of the first scanner 7 reaches $V_{LCONST}$, the braking voltage is applied to the scanner optical system driving motor so that the scanner optical system stops. Instead, it is also possible that, as shown in FIG. 9, during change of the velocity of the first scanner 7 from $V_{HP}$ to a predetermined velocity $V_{LCONST}$, the velocity of the scanner optical system is controlled so that the target velocity is calculated from the below-mentioned equation. Then, when the velocity of the first scanner 7 reaches $V_{LCONST}$, the braking voltage is applied to the scanner optical system driving motor so that the scanner optical system stops.

$$Vref = \sqrt{\frac{\alpha}{2b}\left((X_0 - X) + b\right)}$$

In the above-mentioned equation, 'b' is a predetermined positive number.

By using these methods, it is possible to reduce the absolute value of the acceleration of the scanner optical system when the scanner optical system stops. Thereby, it is possible to reduce vibration and a stop position error. The methods of FIG. 8 and FIG. 9 are advantageous for reducing vibration when the scanner optical system stops. However, a longer time is required for stopping the scanner optical system.

Figure 10:
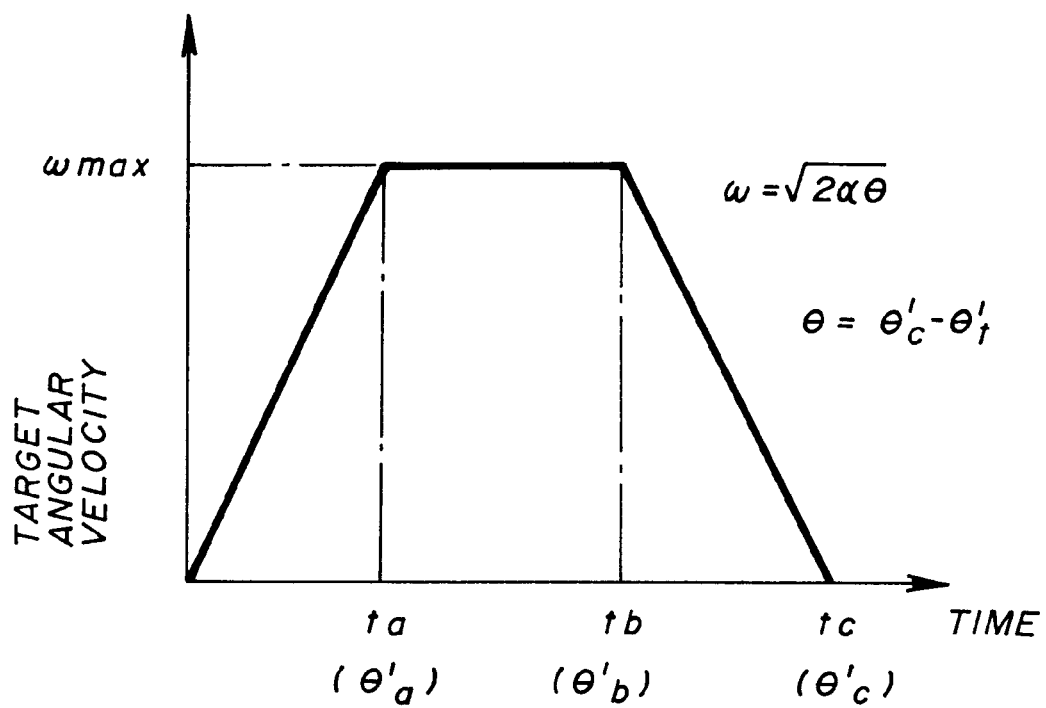
FIG. 10 shows a graph of target velocity for the time axis in a motor control device in any one of a second embodiment, a variant of the second embodiment, a third embodiment, a fourth embodiment, a fifth embodiment, a sixth embodiment, an eighth embodiment, and a ninth embodiment of the present invention.

FIG. 10 shows a graph of target velocity with respect to the time axis in a motor control device in a second embodiment of the present invention. A motor is driven so that the motor rotates finally $\Theta'_c$. For this purpose, the motor is controlled in three patterns: acceleration, velocity constant and deceleration. Such a manner of driving is called 'trapezoid driving'. In the acceleration, the motor is accelerated until the time ta. This acceleration may be the full acceleration. Thus, the velocity of the motor reaches target angular velocity $\omega$max. Then, until the time tb, the motor is controlled so as to rotate at the constant angular velocity $\omega$max. Then, finally, the motor is controlled so as to be decelerated at a target angular velocity of $\omega=\sqrt{2\alpha\Theta}$. Thus, the motor stops at the angle $\Theta'_c$. There, $\Theta$ represents the remaining angle to the target angle. When $\Theta'_r$ represents the motor rotation angle at any time t, $\Theta=\Theta'_c-\Theta'_r$.

Figure 11:
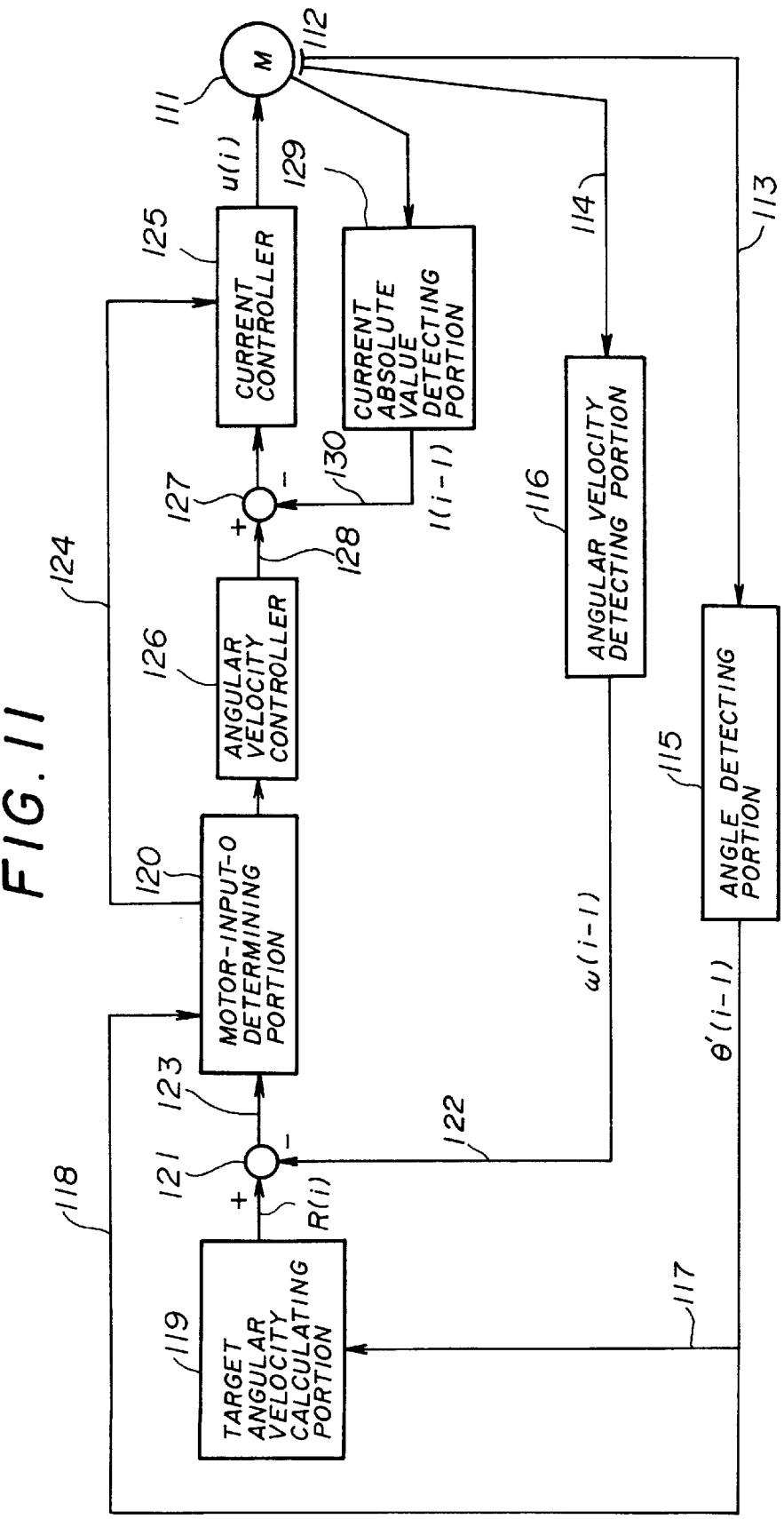
FIG. 11 shows a block diagram of a control system in the motor control device in any one of a second embodiment, a variant of the second embodiment, a third embodiment, a fourth embodiment, a fifth embodiment, a sixth embodiment, an eighth embodiment, and a ninth embodiment of the present invention.

FIG. 11 shows a block diagram of a control system of the motor control device in the second embodiment. A signal detected by a rotary encoder 112 provided to a motor 111 is given to an angle detecting portion 115 and an angular velocity detecting portion 116 via feedback paths 113 and 114, respectively. An angle $\Theta'(i-1)$ detected by the angle detecting portion 115 is given to a target angular velocity calculating portion 119 and a motor-input-0 determining portion 120 via feedback paths 117 and 118, respectively. The target angular velocity calculating portion 119, based on the target angular velocity graph shown in FIG. 10, provides a target angular velocity R(i) corresponding to a given angle $\Theta'(i-1)$ to an operation portion 121. Angular velocity $\omega(i-1)$ detected by the angular velocity detecting portion 116 is input to the operation portion 121 via a feedback path 122. The operation portion 121 obtains the difference between R(i) and $\omega(i-1)$, and gives the difference to the motor-input-0 determining portion 120 via a path 123. The motor-input-0 determining portion 120 uses the current angle given via the path 118 and the sign of the value given via the path 123 (details will be described later), and thus, determines whether a motor input is to be 0 or not. When the motor-input-0 determining portion 120 determines that 0 is given as the motor input, the motor-input-0 determining portion 120 gives a signal indicating this determination result to a current controller 125 via a path 124. When the motor-input-0 determining portion 120 determines that the motor input is not to be 0, the motor-input-0 determining portion 120 gives the output of the operation portion 121, as it is, to an angular velocity controller 126. The angular velocity controller 126 is, for example, a controller such as that performing a proportional-control (P-control) operation, and gives the result of the operation to an operation portion 127 via a path 128.

The absolute value of the current flowing through the motor 111 is detected by a current absolute value detecting portion 129 and is given to the operation portion 127 via a path 130. The operation portion 127 obtains the difference between the signal via the path 128 and the signal via the path 130, and provides the difference to the current controller 125. The current controller 125 includes a controller which performs, for example, a proportional-and-integral control (PI-control) operation, and a forcible-0-output portion. The current controller 125 determines whether the controller (for example, of PI-control) or the forcible-0-output portion is used. When the signal indicating that 0 is given as the motor input is given to the current controller 125 via the path 124, the current controller 125 outputs 0 to the motor 111 as an output signal u(i). When the signal indicating that 0 is given as the motor input is not provided to the current controller 125, the current controller 125 gives the operation result of the operation portion 127 to the motor 111. By repeating the above-described loop operations, the motor control device controls the motor 111 to operate stably based on the angular velocity graph shown in FIG. 10.

Figure 12:
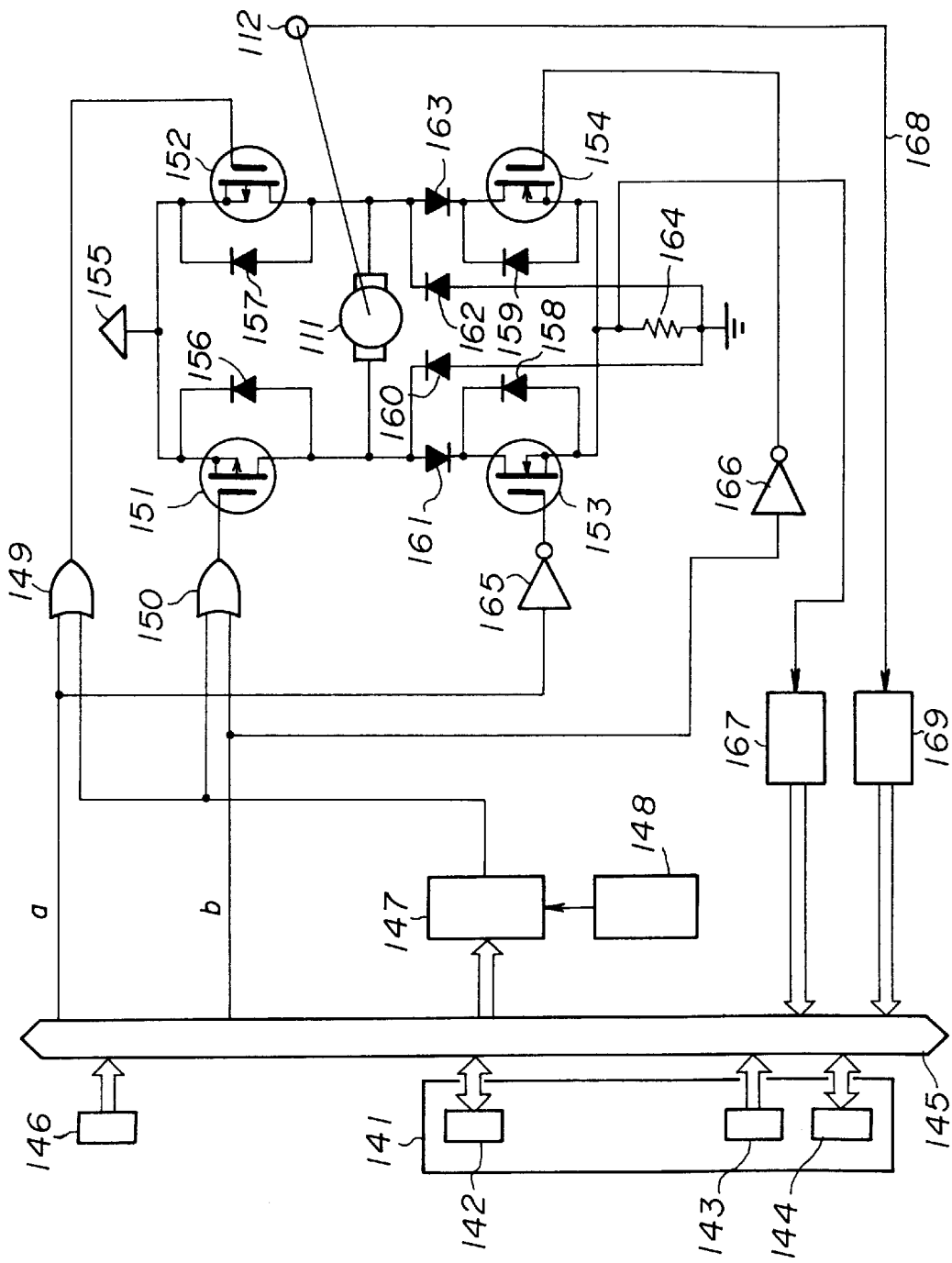
FIG. 12 shows a block diagram of a control device which is applied to a moving unit driving device in any one of a second embodiment, a variant of the second embodiment, a third embodiment, a fourth embodiment, a fifth embodiment, a sixth embodiment, an eighth embodiment, and a ninth embodiment of the present invention.

FIG. 12 shows a block diagram of the motor control device for achieving a moving unit driving device in the second embodiment of the present invention. A microcomputer 141 includes a microprocessor 142, a read-only memory (ROM) 143 and a random access memory (RAM) 144, and they are connected with each other via a bus 145. A state instruction generating device 146 outputs a state instruction signal which gives instructions of a state (target angular velocity) of the motor 111, and generates an angular velocity instruction signal and so forth. This state instruction generating device 146 is also connected with the bus 145. An output 168 of a rotary encoder 112 provided to the motor 111 is connected to a state detecting interface device 169. The state detecting interface device 169 processes the output of the rotary encoder 112 and converts the output into a digital value. The state detecting interface device 169 includes a counter which counts output pulses. A driving interface device 147, based on a signal from a reference clock pulse generating device 148, converts the calculation result (u(i) of FIG. 11) of the microcomputer 141 based on the control system shown in FIG. 11 into a pulse signal (control signal), and outputs the pulse signal. The pulse signal is used for operating a driving device, described later, which includes power semiconductor devices such as transistors.

Here, in connection with the driving device described below, a low level of the pulse signal indicates ON and a high level of the pulse signal indicates OFF.

The driving device includes a power source 155, transistors 151, 152, 153 and 154, which are connected with the motor 111 so as to form a bridge connection, diodes 156, 157, 158 and 159, which are connected to these transistors in parallel, respectively, a current detecting resistor 164, diodes 160, 161, 162 and 163, which form a current detecting circuit, OR gates 149 and 150 and inverters 165 and 166, which are used for turning on and turning off the transistors 151, 152, 153 and 154. The microcomputer 141 outputs motor rotation direction instruction signals 'a' and 'b' to input terminals of the two-input OR gates 149 and 150, and to the inverters 165 and 166. The outputs of the inverters 165 and 166 are connected to the gates of the transistors 153 and 154, respectively. The output of the driving interface device 147 is connected to the other input terminals of the OR gates 149 and 150. The outputs of the two-input OR gates 149 and 150 are connected to the gates of the transistors 151 and 152, respectively. When the motor 111 is to be rotated forwardly, for example, the signal 'a' is set to be the high level and the signal 'b' is set to be the low level. Because these signals are input to the gates of the transistors 153 and 154 via the inverters 165 and 166, respectively, the transistor 153 turns off and the transistor 154 turns on. Further, in this case, because the signal 'a' is at the high level, the output of the OR gate 149 provides a high-level signal to the gate of the transistor 152 without regard to the output signal of the driving interface device 147. Accordingly, the transistor 152 turns off.

Here, because the input signal 'b' from the microcomputer 141 is at the low level, the output of the OR gate 150 changes depending on the output signal of the driving interface device 147. When the output signal of the driving interface device 147 is at the low level, the output of the OR gate 150 is at the low level. Accordingly, the transistor 151 turns on. As a result, each of the transistors 151 and 154 turns on and each of the transistors 152 and 153 turns off. As a result, the motor 111 rotates forwardly. Further, when the output signal of the driving interface device 147 is at the high level, no voltage is applied to the motor. When the motor 111 to be rotated reversely, the signal 'a' is to be set to low level and the signal 'b' is set to high level.

The driving current of the above-described operations is detected as the voltage between the two ends of the current detecting resistor 164 by a detecting device 167. The detected driving current is input to the microcomputer via the bus 45.

By setting the resistance of the current detecting resistor 164 to be sufficient small in comparison to the armature resistance of the motor, the detecting device 167 can be formed by a general-purpose operational amplifier and so forth. Thereby, based on the control system shown in FIG. 11, the rotation of the motor 111 is controlled based on the pulse signal output from the driving interface device 147, and thus the motor 111 rotates at a desired angular velocity. The above-described example is one example using discrete-type microcomputers. However, similar functions can be obtained using microcomputers in which part or the all the devices are formed to be one chip.

The state detecting interface device 169 processes the output of the rotary encoder 112 and detects the angular velocity of the motor 111. The output of the rotary encoder 112 (shown in FIG. 13) is connected to an interrupt terminal of the microprocessor 142 via the state detecting interface device 169. The state detecting interface 169 includes the counter which counts reference clock pulses (CLK shown in FIG. 13).

Figure 13:
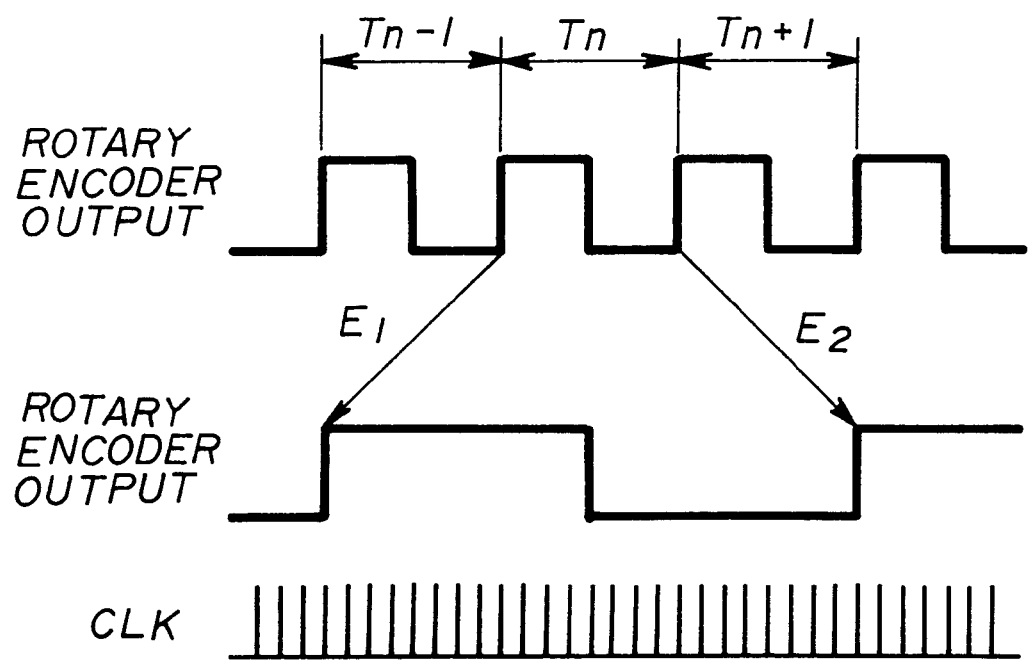
FIG. 13 shows time charts for illustrating operation of a state detecting interface device which processes output of a rotary encoder.
Figure 14:
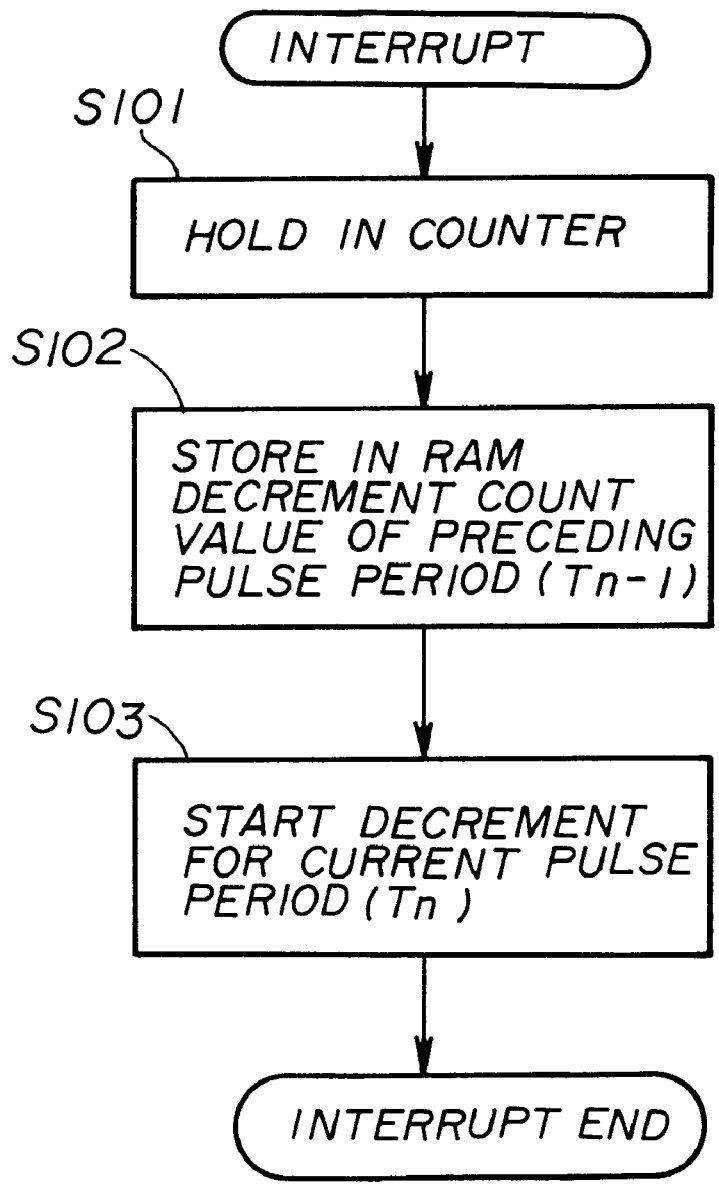
FIG. 14 shows a flowchart illustrating an interrupt routine when the edge $E_1$ of the output of the rotary encoder reaches a microprocessor.

In FIG. 13, before the edge $E_1$ of the rotary encoder output pulses is input, the counter performs decrement counting from a given count value (for example, 0FFFFH). When the edge $E_1$ is input to the interrupt terminal of the microprocessor 142, the interrupt routine shown in FIG. 14 is started.

The decrement count value of the counter for the preceding period Tn−1 is held in a built-in register of the counter, in S101. Then, the held decrement count value is stored in the RAM 144 shown in FIG. 12, in S102. Then, the count initial value (0FFFFH) is given to the counter and decrement counting is started again for the current period Tn, in S103. Thus, the interrupt process is finished. When the edge $E_2$ is input to the interrupt terminal of the microprocessor 142, the steps S101, S102 and S103 are repeated. The angular velocity ω(i) in the period Tn is obtained as follows:

$$\omega(i)=k/(\text{Tclk}\cdot\text{Ne}\cdot n),$$

where:

Tclk represents the period of the reference clock pulses (CLK);

Ne represents the rotary encoder dividing number per unit angle;

n represents the reference clock pulse count value
=0FFFFH−(decremented count value); and k represents a conversion constant to the angular velocity.

The angle detected in the angle detecting portion 115 shown in FIG. 11 can be easily obtained as follows: The microcomputer 141 counts the number of output pulses of the rotary encoder 112 and multiplies the count value by a conversion constant to the angle (the angle per one pulse).

Figure 15:
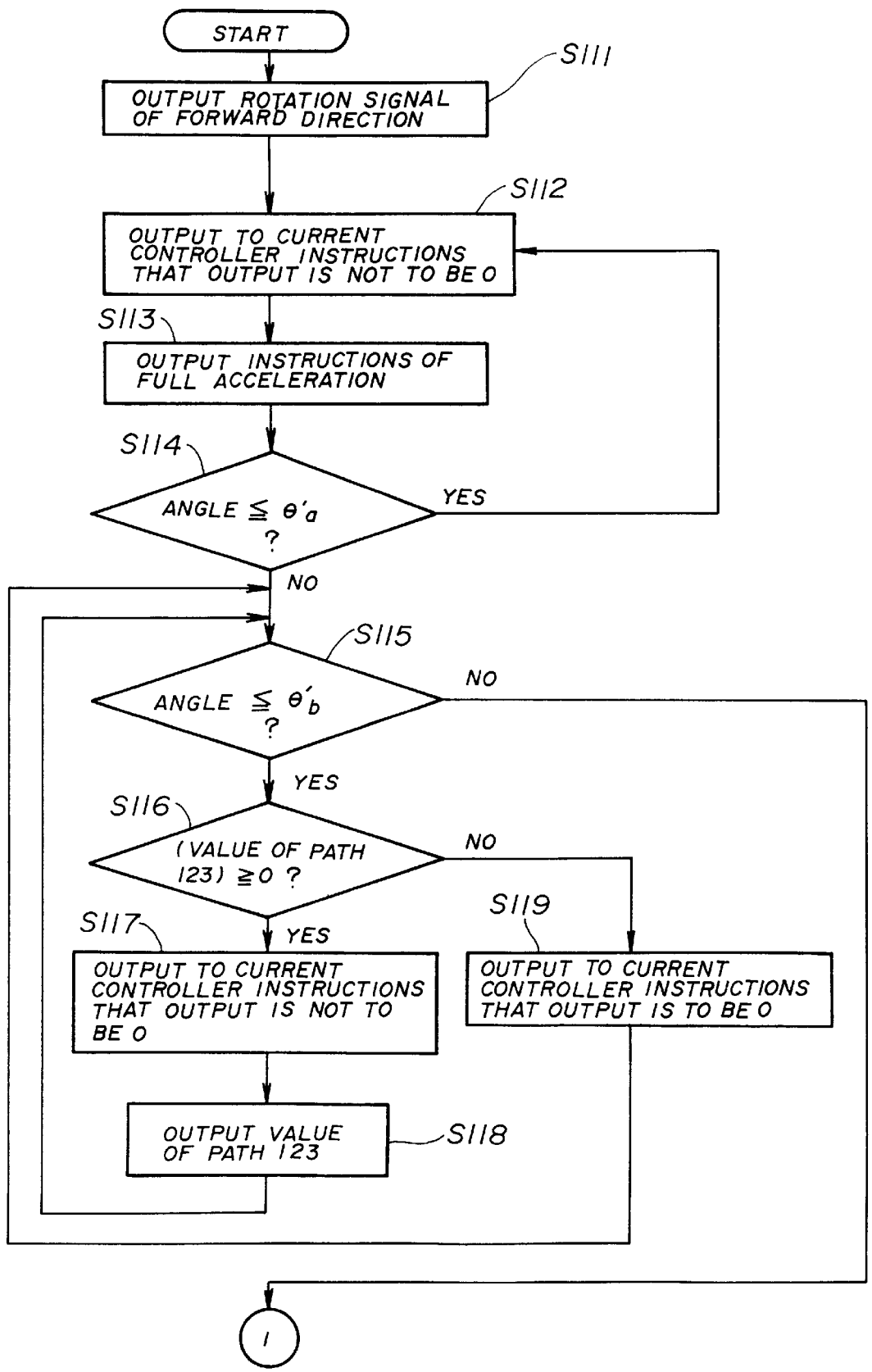
FIGS. 15 and 16 show a flowchart illustrating operations of a motor-input-0 determining portion in the second embodiment of the present invention.
Figure 16:
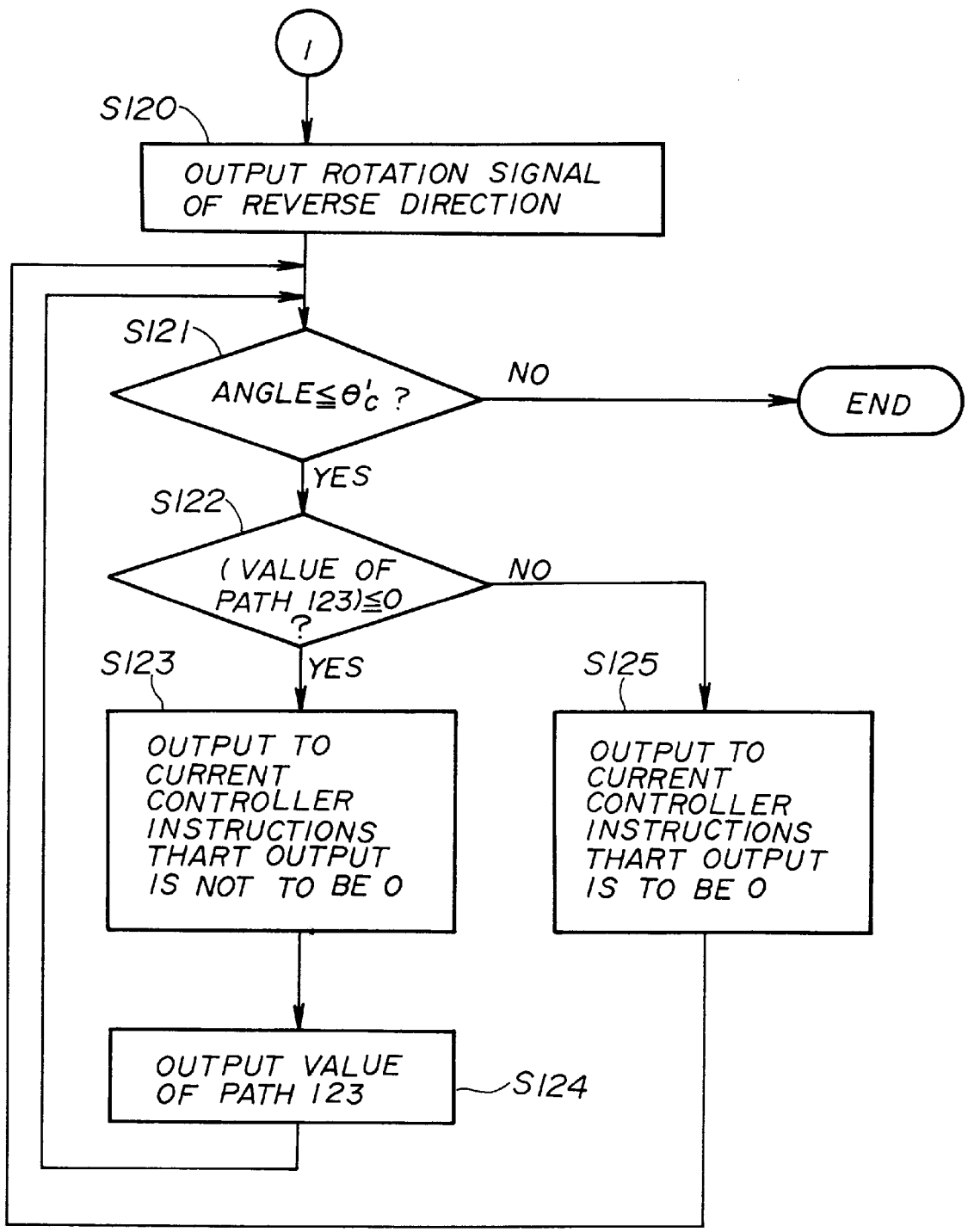

Operations of the motor-input-0 determining portion 120 shown in FIG. 11 will now be described with reference to flowcharts of FIGS. 15 and 16. When the motor trapezoid driving control is started, the microcomputer 141 operates in accordance with a software program so that the microcomputer 141 is to output a rotation signal of a forward rotation, in S111. In response thereto, the microcomputer 141 outputs the signal 'a' of the high level and the signal 'b' of the low level. Then, in S112, information that output is not 0 is output to the current controller 125 via the path 124. This outputting may be easily performed using, for example, a flag. Because it is at a starting up condition, full-acceleration instructions are output to the angular velocity controller 126, in S113.

In S114, it is determined whether or not the motor angle has reached the velocity constant state starting angle $\Theta'_a$, the first target angle of the trapezoid graph shown in FIG. 10. When it is determined that the motor angle has not yet reached the velocity constant state starting angle $\Theta'_a$, it is determined that it is the acceleration state, the operation returns to S112, and S112, S113 and S114 are repeated. When it is determined that the motor angle has reached the velocity constant state starting angle $\Theta'_a$, at it is determined in S115 whether or not the motor angle has reached the deceleration starting angle $\Theta'_b$. When it is determined that the motor angle has not yet reached the deceleration starting angle $\Theta'_b$, it is determined that it is the velocity constant state. Then, the detected angular velocity ω(i−1) is subtracted from the target angular velocity R(i) and it is determined whether the subtraction result on the path 123 shown in FIG. 11 is positive or negative, in S116. When the subtraction result is not negative, information that output is not to be 0 is output to the current controller 125 via the path 124, in S117. The value on the path 123 is, as it is, output to the angular velocity controller 126, in S118. Then, the operation returns to S115 and constant velocity driving is continued. When it is determined in S116 that the value on the path 123 is negative, information that the output is to be 0 is output to the current controller 125 via the path 124, in S119. In response thereto, the driving interface device 147 outputs the high-level signal.

When it is determined in S115 that the motor angle has reached the deceleration starting angle $\Theta'_b$, the microcomputer 141 operates in accordance with the software program so that the microcomputer 141 outputs a rotation signal of reverse rotation, in S120. In response thereto, the microcomputer 141 outputs the signal 'a' at the low level and the signal 'b' at the high level. Then, it is determined whether the motor angle has reached the target angle $\Theta'_c$, in S121. If it is determined that the motor angle has not reached the target angle $\Theta'_c$ yet, it is determined that it is the deceleration state. Then, the detected angular velocity $\omega(i-1)$ is subtracted from the target angular velocity $R(i)$ and it is determined whether the subtraction result on the path 123 shown in FIG. 11 is positive or negative, in S122. When the subtraction result is not positive, information that the output is not to be 0 is output to the current controller 125 via the path 124, in S123. The value on the path 123 is, as it is, output to the angular velocity controller 126, in S124. Then, the operation returns to S121 and deceleration driving is continued. When it is determined in S122 that the value on the path 123 is positive, information that the output is to be is output to the current controller 125 via the path 124, in S125. In response thereto, the driving interface device 147 outputs the high-level signal. When it is determined in S121 that the motor angle has reached the target angle $\Theta'_c$, the operation is stopped. In this state, the motor is stopped at the target angle.

Figure 17:
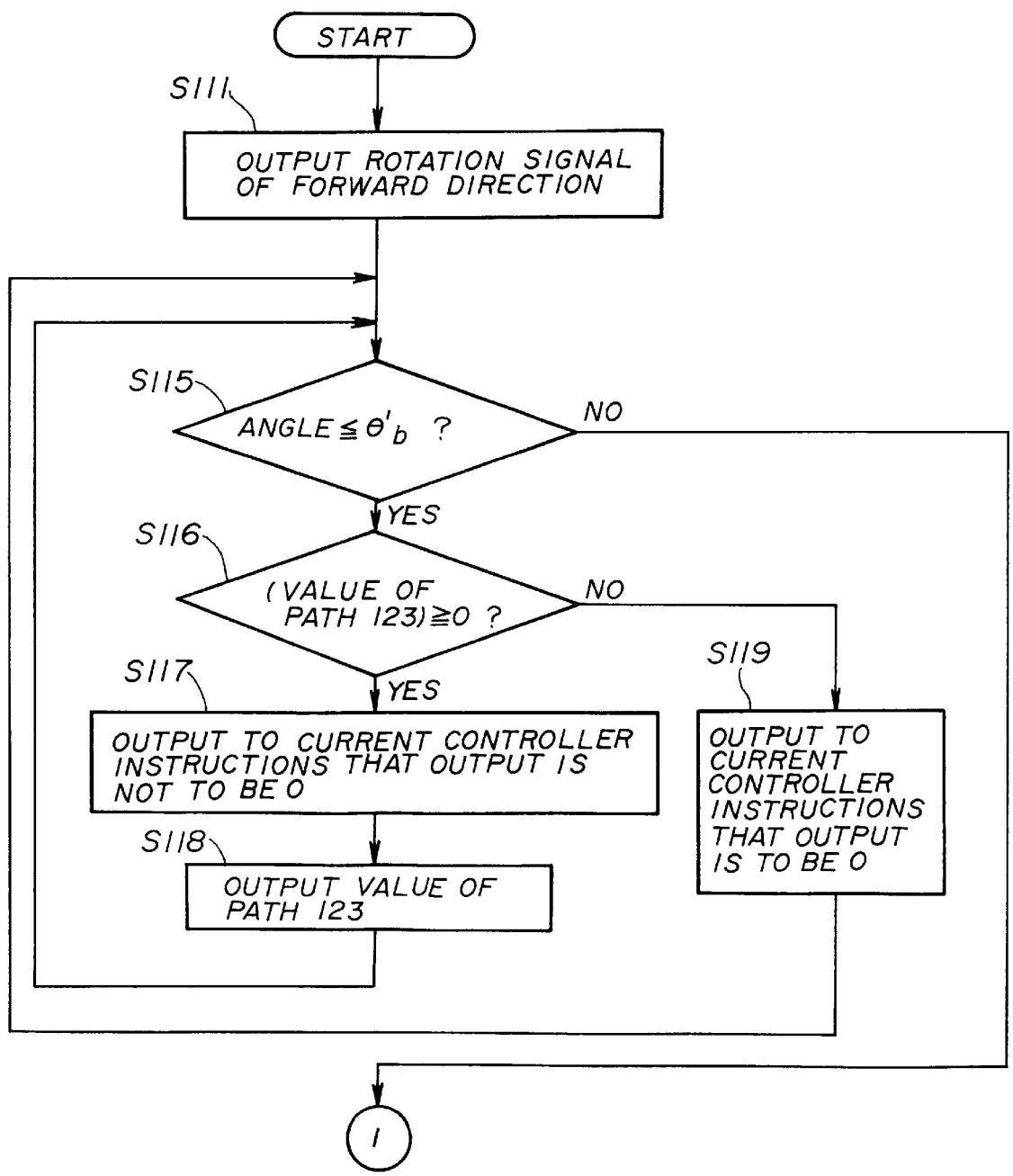
FIG. 17 show a part of a flowchart illustrating operations of a motor-input-0 determining portion in the variant of the second embodiment of the present invention.

A variant embodiment of the second embodiment will now be described. The differences between the variant embodiment and the second embodiment are shown in FIG. 17. Specifically, except that S112, S113 and S114 are omitted in the variant embodiment, the operation flowchart of the second embodiment and that of the variant are the same as one another. In the variant embodiment, until the motor angle reaches the deceleration start angle $\Theta'_b$, the operations of S115, S116, S117, S118 and S119 are appropriately repeated. That is, these operations are performed in acceleration and in the velocity constant state.

As described above, each of the second embodiment and the variant of the second embodiment of the present invention is the driving control device for controlling the motor's angular velocity in the trapezoid driving as shown in FIG. 10. The target angular velocity $\omega$ in deceleration is obtained as follows:

$$\omega = \sqrt{2\alpha\Theta},$$

where $\Theta$ represents the angle which the motor rotates until the motor stops, and $\alpha$ represents the absolute value of the angular acceleration in deceleration. This driving control device is the motor control device of the current driving system in which the current flowing through the motor is controlled. In the motor control device, only the absolute value of the current flowing through the motor is detected and a current feedback loop is formed. Sequential control of motor rotation angle according to the trapezoid driving is performed. In deceleration, when the actual angular velocity is lower than the target angular velocity, the motor input voltage is to be 0. In the velocity constant state or in acceleration and the velocity constant state, when the actual angular velocity is higher than the target angular velocity, the motor input voltage is to be 0. Thereby, it can be prevented that the motor current is reversed contrary to the control sequence. Further, even if high-voltage power source is used, stable current feedback control based on current detection using the current detecting resistor, operational amplifier and so forth can be achieved, and an inexpensive control system can be achieved.

Figure 18:
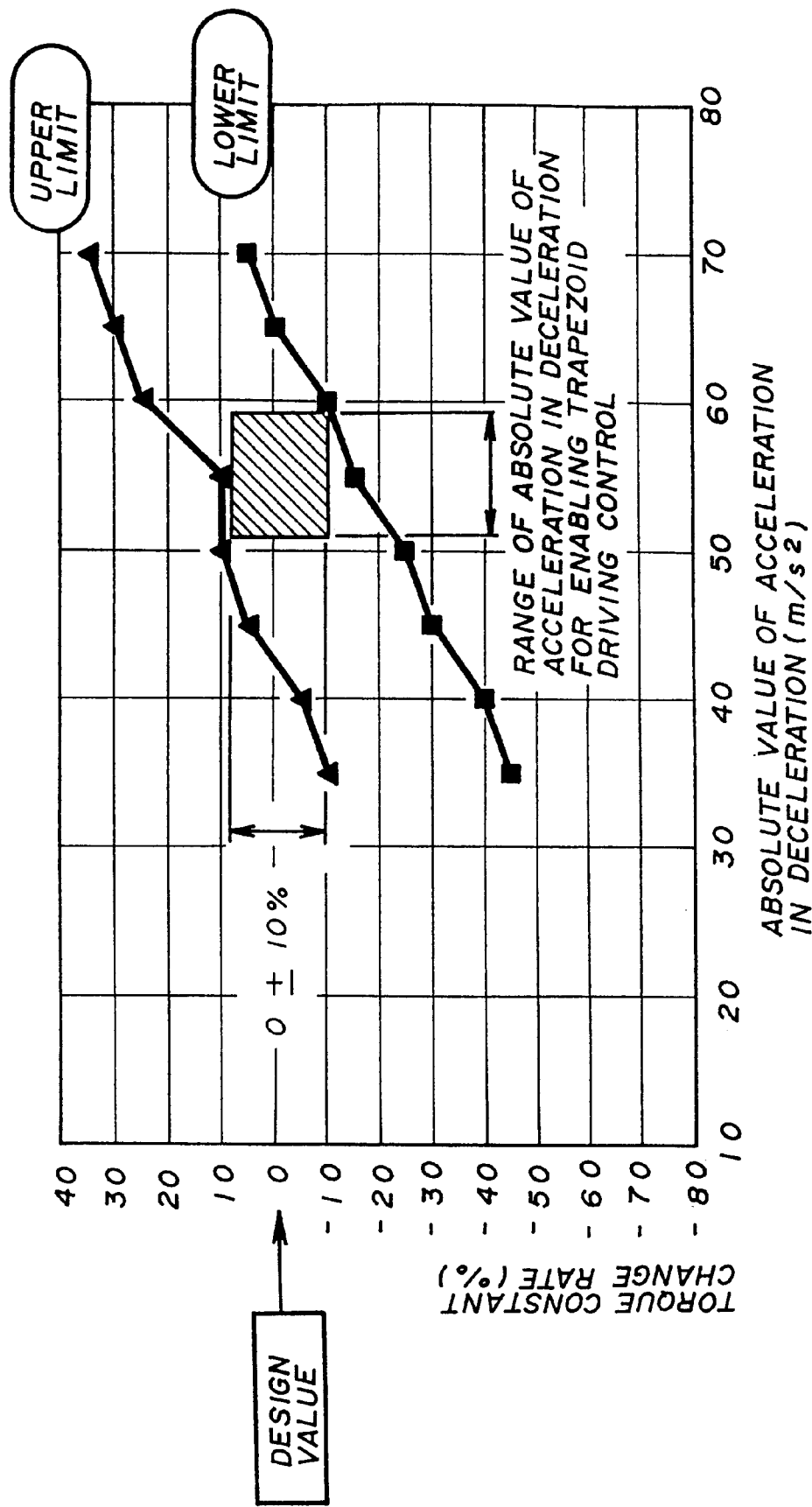
FIG. 18 shows a graph, used in the third embodiment, of the trapezoid control enable range when the x-axis represents acceleration in deceleration and the y-axis represents errors of the torque constant or the voltage constant of the motor with respect to the design value.

FIG. 18 shows the range of acceleration in deceleration in the trapezoid driving control in consideration of the range of the torque constant or voltage constant. In FIG. 18, the x-axis represents the absolute value of acceleration in deceleration of a moving unit which is driven by a motor. The acceleration of the moving unit is in proportion to the angular acceleration of the motor. The y-axis represents an error range with respect to the design value of the torque constant or the voltage constant of the motor. The rectangle range with hatching is determined by whether actual velocity can follow target velocity, especially in deceleration until the motor stops. FIG. 18 shows that there is an acceleration $\alpha$, at which actual velocity follows target velocity, depending on the torque constant or the voltage constant of the motor. Accordingly, when determining the acceleration $\alpha$ at deceleration, the design value of the torque constant or the voltage constant of the motor is considered as a reference. Further, it is also necessary to consider whether deceleration is possible in a design tolerance range. For example, when considering that the design tolerance range is ±10%, in the example of FIG. 18, it can be seen that the absolute value of the acceleration $\alpha$ should be selected from the range between 50 and 60 m/s$^2$. The graph of FIG. 18 can be easily obtained from simulation based on given hardware.

The above-described method in a third embodiment of the present invention of selecting an appropriate acceleration in deceleration according to the present invention can be applied to each of the second embodiment and the variant of the second embodiment.

In the above-described method in the third embodiment of the present invention, in each of the second embodiment and the variant of the second embodiment, the graph such as that shown in FIG. 18 is produced. In the graph, a rectangle range is defined between the upper limit and the lower limit of the range of the torque constant or the voltage constant of the motor enabling trapezoid driving control. The top and bottom sides of the rectangle range are defined so as to include all the error range with respect to the design value of the torque constant or the voltage constant of the motor. The left and right sides of the rectangle range are defined by a range of the absolute value of acceleration in deceleration for enabling the trapezoid driving control, which range is set to be maximum. The absolute value of acceleration in deceleration is selected from this range. The above-mentioned rectangle range includes all the error range with respect to the design value of the torque constant or voltage constant of the motor. Accordingly, when the thus-selected absolute value of acceleration in deceleration is used, even if change of the torque constant or voltage constant of the motor occurs, stable control of acceleration in deceleration can be achieved.

In the above-mentioned method, even if there is change in the torque constant or voltage constant of the motor, it is possible to determine acceleration in deceleration for which stable control is possible. However, in order to produce the graph shown in FIG. 18, much simulation is needed.

It is considered that, when precision hardware is used, change of the torque constant or voltage constant is small.

Accordingly, in a method in a fourth embodiment of the present invention of selecting an appropriate acceleration in deceleration for performing stable trapezoid driving control according to the present invention, as shown in TABLE 1, the torque constant is considered to be the design value. Then, whether control of acceleration in deceleration is possible or impossible is studied. For example, in the case of TABLE 1, the range of absolute value of acceleration in deceleration for performing stable trapezoid driving control is between 45 m/s$^2$ and 65 m/s$^2$. This range is wider than the range obtained from using the graph 18. In the method in the fourth embodiment, it is considered that precision hardware is used as mentioned above. Accordingly, the range is wider than that of the method in the third embodiment.

TABLE 1

TORQUE CONSTANT IS DESIGN VALUE

| ABSOLUTE VALUE OF ACCELERATION IN DECELERATION ($m/s^2$) | 40 | 45 | 50 | 55 | 60 | 65 | 70 |
|---|---|---|---|---|---|---|---|
| CONTROL POSSIBLE OR IMPOSSIBLE | IMPOSSIBLE | POSSIBLE | POSSIBLE | POSSIBLE | POSSIBLE | POSSIBLE | IMPOSSIBLE |

In the method in the fourth embodiment, an error range with respect to the design value of the given torque constant of the motor in the method in the third embodiment is considered to be 0%. Accordingly, acceleration in deceleration in the design value of the given torque constant is determined. Then, the stable control device in the design value of the given torque constant is produced. Thereby, a time required for producing the control device can be reduced.

The method in the fourth embodiment of selecting an appropriate acceleration in deceleration according to the present invention can also be applied to each of the second embodiment and the variant of the second embodiment.

Figure 19:
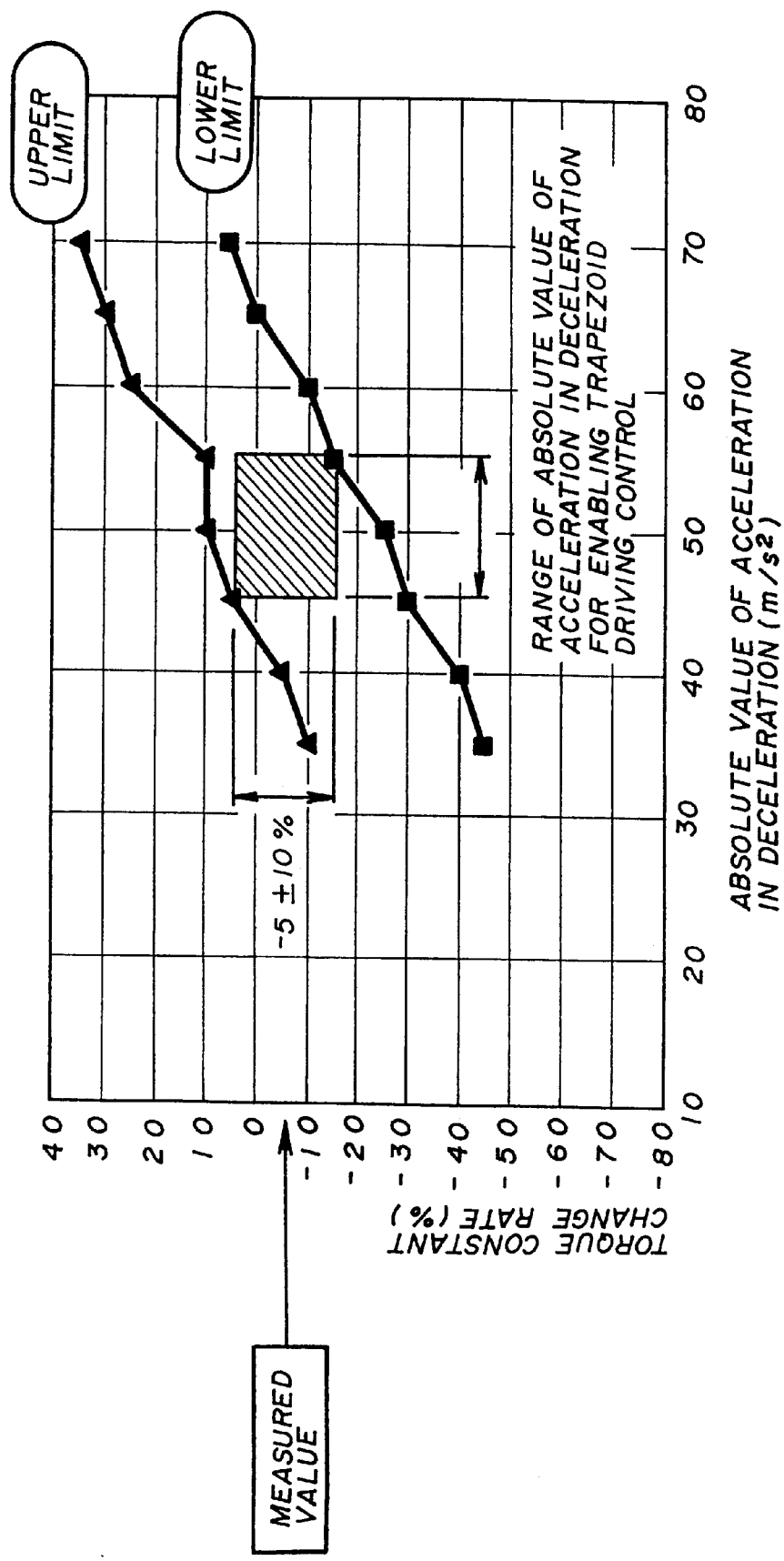
FIG. 19 shows a graph, used in the fifth embodiment, of the trapezoid control enable range when the x-axis represents acceleration in deceleration and the y-axis represents errors of the torque constant or the voltage constant of the motor with respect to the design value.

FIG. 19 shows the range of acceleration in deceleration in the trapezoid driving control in consideration of the range of the torque constant or voltage constant. In FIG. 19, the x-axis represents the absolute value of acceleration in deceleration of a moving unit which is driven by a motor. The acceleration of the moving unit is in proportion to the angular acceleration of the motor. The y-axis represents an error range with respect to the design value of the torque constant or the voltage constant of the motor. The rectangle range with hatching is determined by the matter as to whether actual velocity can follow target velocity, especially in deceleration until the motor stops.

FIG. 19 shows that there is acceleration α, at which actual velocity follows target velocity, depending on the torque constant or the voltage constant of the motor. In this method in a fifth embodiment of the present invention, in order to determine acceleration α in deceleration for which control is surely possible even if the torque constant or voltage constant of the motor is different from the design value, the measured value of the torque constant or the voltage constant of the motor is considered as a reference. Further, it is also necessary to consider whether deceleration is possible in a design tolerance range. For example, when considering that the measured value is −5% of the design value and the design tolerance range is ±10%, in the example of FIG. 19, it can be seen that the absolute value of the acceleration α should be selected from the range between 45 and 55 $m/s^2$. The graph of FIG. 19 can be easily obtained from simulation based on given hardware.

The above-described method in the fifth embodiment of selecting an appropriate acceleration in deceleration according to the present invention can also be applied to each of the second embodiment and the variant of the second embodiment.

In the above-described method in the fifth embodiment of the present invention, in each of the second embodiment and the variant of the second embodiment, the graph such as that shown in FIG. 19 is produced. In the graph, a rectangle range is defined between the upper limit and the lower limit of the range of the torque constant or the voltage constant of the motor enabling trapezoid driving control. Previously, the torque constant or voltage constant of the motor is measured. The top and bottom sides of the rectangle range are defined so as to include all the error range with respect to the measured value of the torque constant or the voltage constant of the motor. The left and right sides of the rectangle range are defined by a range of the absolute value of acceleration in deceleration for enabling the trapezoid driving control, which range is set to be maximum. The absolute value of acceleration in deceleration is selected from this range. The above-mentioned rectangle range includes all the error range with respect to the measured value of the torque constant or voltage constant of the motor. Accordingly, the thus-selected absolute value of acceleration in deceleration is used, even if there is a large initial error of the torque constant or voltage constant of the motor, because this error and also change of the torque constant or voltage constant of the motor due to time elapsing in use of the control device are considered in the method in the fifth embodiment, stable control of acceleration in deceleration can be achieved.

In the method in the fifth embodiment, even if the actual torque constant or voltage constant of the motor is different from the design value and also there is change of the torque constant or voltage constant of the motor, it is possible to determine acceleration in deceleration for which stable control is possible. However, in order to produce the graph shown in FIG. 19, much simulation is needed.

It is considered that, when precision hardware is used, change of the torque constant or voltage constant is small.

Accordingly, in a method in a sixth embodiment of the present invention of selecting an appropriate acceleration in deceleration for performing stable trapezoid driving control according to the present invention, as shown in TABLE 2, the torque constant is considered to be the measured value. Then, whether control of acceleration in deceleration is possible or impossible is studied. For example, in the case of TABLE 2, the range of absolute value of acceleration in deceleration for performing stable trapezoid driving control is between 40 $m/s^2$ and 60 $m/s^2$. This range is wider than the range obtained from using the graph 19. In the method in the sixth embodiment, it is considered that precision hardware is used as mentioned above. Accordingly, the range is wider than that of the method in the fifth embodiment.

TABLE 2

TORQUE CONSTANT IS MEASURED VALUE

| ABSOLUTE VALUE OF ACCELERATION IN DECELERATION ($m/s^2$) | 35 | 40 | 45 | 50 | 55 | 60 | 65 |
|---|---|---|---|---|---|---|---|
| CONTROL POSSIBLE OR IMPOSSIBLE | IMPOSSIBLE | POSSIBLE | POSSIBLE | POSSIBLE | POSSIBLE | POSSIBLE | IMPOSSIBLE |

In this method, there is no error with respect to the measured value of the given torque constant. Accordingly, acceleration in deceleration in the measured value of the given torque constant is determined. Then, the stable control device in the measured value of the given torque constant is produced. Thereby, a time required for producing the control device can be reduced.

The method in the sixth embodiment of selecting an appropriate acceleration in deceleration according to the present invention can also be applied to each of the second embodiment and the variant of the second embodiment.

In the above-described methods, it is possible to obtain a range of the absolute value of acceleration in deceleration, enabling trapezoid driving control, depending on the design value or the measured value of the torque constant or the voltage constant. In these methods, it is necessary to select one absolute value of acceleration in deceleration from the range of the absolute value of acceleration in deceleration enabling trapezoid driving control.

Figure 20:
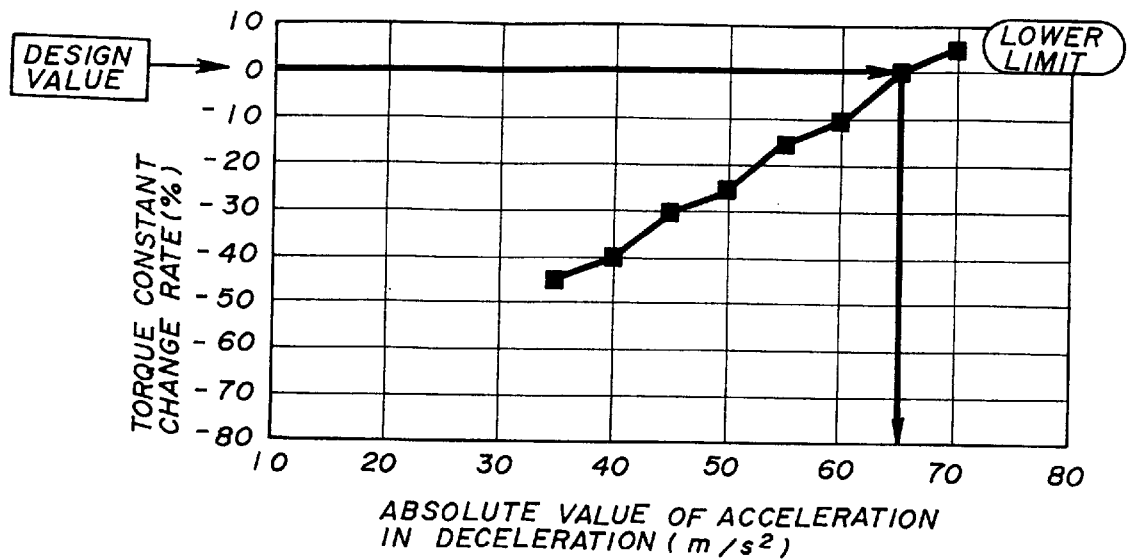
FIG. 20 shows a graph, used in the seventh embodiment, of the lower limit of the trapezoid control enable range when the x-axis represents acceleration in deceleration and the y-axis represents errors of the torque constant or the voltage constant of the motor with respect to the design value.
Figure 21:
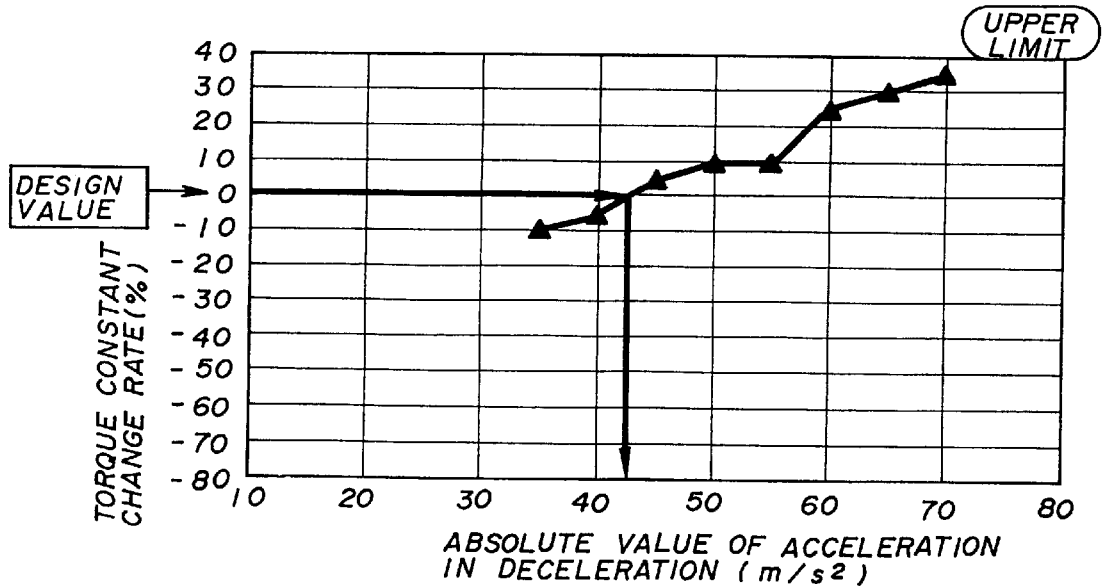
FIG. 21 shows a graph, used in the seventh embodiment, of the upper limit of the trapezoid control enable range when the x-axis represents acceleration in deceleration and the y-axis represents errors of the torque constant or the voltage constant of the motor with respect to the design value.

In a method in a seventh embodiment of the present invention, graphs shown in FIGS. 20 and 21 similar to FIG. 18 are produced. In FIG. 20, only the lower limit of the range of the torque constant or voltage constant of the motor enabling trapezoid driving control is obtained and plotted. In FIG. 21, only the upper limit of the range of the torque constant or voltage constant of the motor enabling trapezoid driving control is obtained and plotted. In the case of FIG. 20, the horizontal line of the given design value of the torque constant or voltage constant of the motor crosses the line of the above-mentioned lower limit on the graph. The absolute value of acceleration in deceleration of this crossing point is determined to be the absolute value of acceleration in deceleration to be used. In the case of FIG. 20, the absolute value of acceleration in deceleration to be used is 65 m/s². Similarly, in the case of FIG. 21, the horizontal line of the given design value of the torque constant or voltage constant of the motor crosses the line of the above-mentioned upper limit on the graph. The absolute value of acceleration in deceleration of this crossing point is determined to be the absolute value of acceleration in deceleration to be used. In the case of FIG. 21, the crossing point is not a plotted point (small black triangle). However, by straight-line interpolation, the absolute value of acceleration in deceleration at the crossing point is known to be 42.5 m/s². In the method of the seventh embodiment, the absolute value of acceleration in deceleration to be used is immediately obtained without performing selection.

Thus, in the method of the seventh embodiment, which can also be applied to each of the second embodiment and the variant of the second embodiment, a graph such as that shown in FIG. 20 or FIG. 21 is produced. Thus, the lower limit or the upper limit of the range of the torque constant or voltage constant of the motor enabling trapezoid driving control is obtained. Based on the line of the lower limit or upper limit of the range of the torque constant or voltage constant of the motor enabling trapezoid driving control, the absolute value of the acceleration in deceleration is obtained for the design value of the torque constant or the voltage constant of the motor. The obtained absolute value of the acceleration in deceleration will be actually used in the trapezoid driving control. Thus, it is possible to immediately determine the acceleration in deceleration, without need of selection, in which stable control can be performed, for the design value of the torque constant or the voltage constant of the motor.

Figure 22:
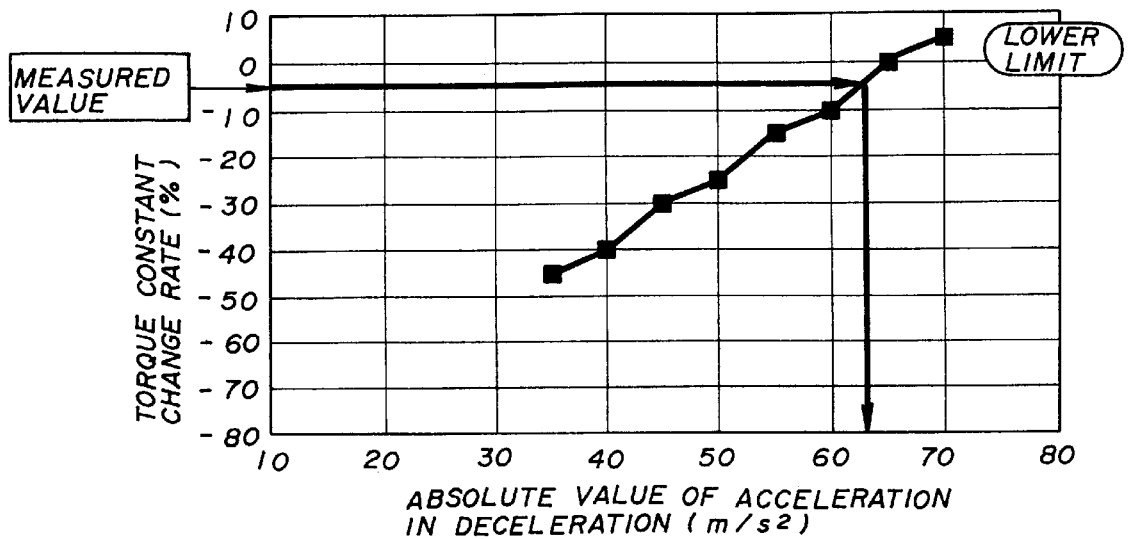
FIG. 22 shows a graph, used in the eighth embodiment, of the lower limit of the trapezoid control enable range when the x-axis represents acceleration in deceleration and the y-axis represents errors of the torque constant or the voltage constant of the motor with respect to the design value.
Figure 23:
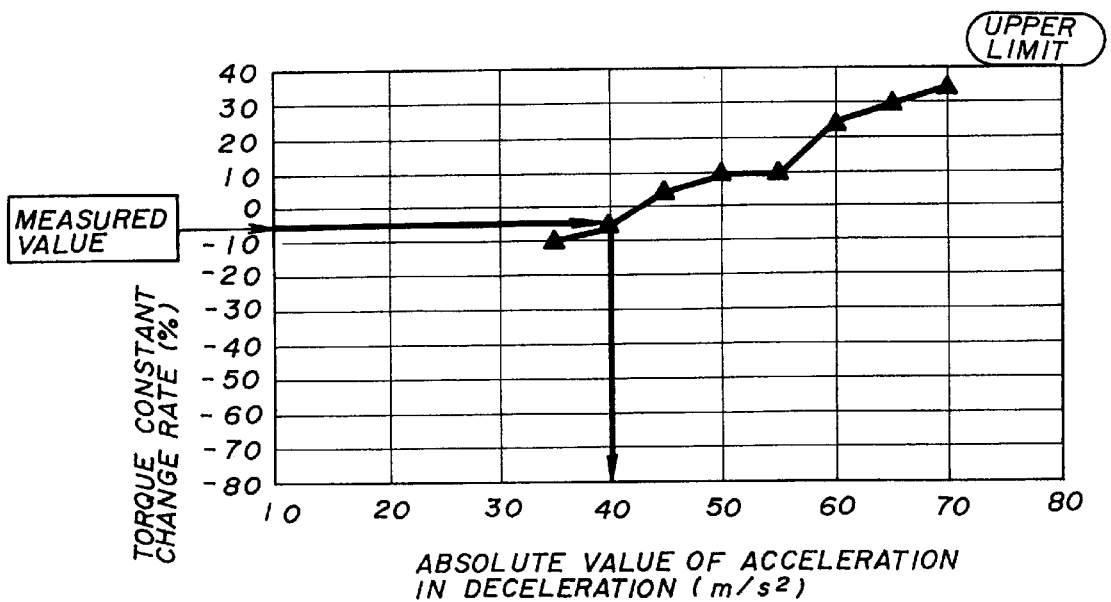
FIG. 23 shows a graph, used in the eighth embodiment, of the upper limit of the trapezoid control enable range when the x-axis represents acceleration in deceleration and the y-axis represents errors of the torque constant or the voltage constant of the motor with respect to the design value.

In a method in an eighth embodiment of the present invention, graphs shown in FIGS. 22 and 23 similar to FIG. 18 are produced. In FIG. 22, only the lower limit of the range of the torque constant or voltage constant of the motor enabling trapezoid driving control is obtained and plotted. In FIG. 23, only the upper limit of the range of the torque constant or voltage constant of the motor enabling trapezoid driving control is obtained and plotted. In the case of FIG. 22, the horizontal line of the measured value of the torque constant or voltage constant of the motor crosses the line of the above-mentioned lower limit on the graph. The absolute value of acceleration in deceleration of this crossing point is determined to be the absolute value of acceleration in deceleration to be used. In the case of FIG. 22, the crossing point is not a plotted point (small black rectangle). However, by straight-line interpolation, the absolute value of acceleration in deceleration at the crossing point is known to be 62.5 m/s². Thus, it is possible to immediately determine the absolute value of the acceleration in deceleration from the measured value without need of selection. Similarly, In the case of FIG. 23, the horizontal line of the measured value of the torque constant or voltage constant of the motor crosses the line of the above-mentioned upper limit on the graph. The absolute value of acceleration in deceleration of this crossing point is determined to be the absolute value of acceleration in deceleration to be used. In the case of FIG. 23, the absolute value of acceleration in deceleration at the crossing point is 40 m/s². Thus, the absolute value of acceleration in deceleration to be used is immediately obtained from the measured value without need of selection.

Thus, in the method of the eighth embodiment, which can also be applied to each of the second embodiment and the variant of the second embodiment, a graph such as that shown in FIG. 22 or FIG. 23 is produced. Thus, the lower limit or the upper limit of the range of the torque constant or voltage constant of the motor enabling trapezoid driving control is obtained. The torque constant or voltage constant is previously measured. Based on the line of the lower limit or upper limit of the range of the torque constant or voltage constant of the motor enabling trapezoid driving control, the absolute value of the acceleration in deceleration is obtained for the measured value of the torque constant or the voltage constant of the motor. The obtained absolute value of the acceleration in deceleration will be actually used in the trapezoid driving control. Thus, it is possible to immediately determine the acceleration in deceleration, without need of selection, for which stable control can be performed, for the measured value of the torque constant or the voltage constant of the motor.

In the above-described methods in the seventh embodiment and eighth embodiment, when the crossing point is not a plotted point (small black rectangle or small black triangle), by straight-line interpolation, the absolute value of acceleration in deceleration at the crossing point is obtained. However, it is also possible that, when using the lower limit, the value of the plotted point which is smaller than the value of the crossing point and is nearest to the crossing point may be used as the absolute value of acceleration in deceleration. In the example of FIG. 22, 60 m/s$^2$ may be used as the acceleration in deceleration for the measured value. When using the upper limit, the value of the plotted point which is larger than the value of the crossing point and is nearest to the crossing point may be used as the absolute value of acceleration in deceleration. In the example of FIG. 21, 45 m/s$^2$ may be used as the acceleration in deceleration for the design value.

TABLE 3 and TABLE 4 show the lower limit and the upper limit of the range of the torque constant or voltage constant of the motor enabling trapezoid driving control for the absolute value of the acceleration in deceleration, respectively.

TABLE 3

| ABSOLUTE VALUE OF ACCELERATION IN DECELERATION (m/s$^2$) | 35 | 40 | 45 | 50 | 55 | 60 | 65 | 70 |
|---|---|---|---|---|---|---|---|---|
| LOWER LIMIT OF TORQUE CONSTANT CHANGE RATE (%) | −45 | −40 | −30 | −25 | −15 | −10 | 0 | 5 |

TABLE 4

| ABSOLUTE VALUE OF ACCELERATION IN DECELERATION (m/s$^2$) | 35 | 40 | 45 | 50 | 55 | 60 | 65 | 70 |
|---|---|---|---|---|---|---|---|---|
| UPPER LIMIT OF TORQUE CONSTANT CHANGE RATE (%) | −10 | −5 | 5 | 10 | 10 | 25 | 30 | 35 |

These tables are previously obtained and stored in the read only memory 143 or the random access memory 144 in the microcomputer 141 shown in FIG. 12. When it is necessary, these tables are used for obtaining the absolute value of acceleration in deceleration.

A case where the torque constant or the voltage constant of the motor is the design value will now be considered. The design value of the change rate of the torque constant or the voltage constant of the motor is 0%. When using the lower limit, 0% of the lower limit of the torque constant change rate is searched for in TABLE 3. From TABLE 3, the absolute value of the acceleration in deceleration is immediately obtained to be 65 m/s$^2$ for 0% of the lower limit of the torque constant change rate.

When using the upper limit, 0% of the lower limit of the torque constant change rate is not present in TABLE 4. Then, the nearest smaller and larger values are searched for. The nearest smaller and larger values are −5% and 5%. Straight-line interpolation is performed using the absolute values of the accelerations in deceleration, 40 m/s$^2$ and 45 m/s$^2$ for −5% and 5%. As a result, 42.5 m/s$^2$ is obtained for 0%.

For a case where the torque constant or voltage constant of the motor is the measured value, the absolute value of the acceleration in deceleration can be obtained similarly. Assuming that the measured value is −5% with respect to the design value, when the lower limit is used, −5% of the lower limit of the torque constant change rate is searched for in TABLE 3. −5% of the lower limit of the torque constant change rate is not present in TABLE 3. Then, the nearest smaller and larger values are searched for. The nearest smaller and larger values are −10% and 0%. Straight-line interpolation is performed using the absolute values of the accelerations in deceleration, 60 m/s$^2$ and 65 m/s$^2$ for −10% and 0%. As a result, 62.5 m/s$^2$ is obtained for −5%. When using the upper limit, −5% of the lower limit of the torque constant change rate is searched for in TABLE 4. From TABLE 4, the absolute value of the acceleration in deceleration is immediately obtained to be 40 m/s$^2$ for −5% of the lower limit of the torque constant change rate.

Thus, in a method in a ninth embodiment of the present invention, the lower limit or the upper limit of the range of the torque constant or voltage constant of the motor enabling trapezoid driving control is stored as the table. Accordingly, the absolute value of acceleration in deceleration for the design value of the measured value of the torque constant or the voltage constant of the motor can be easily searched for and set for the trapezoid driving control easily inside the device.

In the above-described method in the ninth embodiment, when the design value or the measured value is not present in the table, by straight-line interpolation, the absolute value of acceleration in deceleration at the design value or the measured value is obtained. However, it is also possible that, when using the lower limit, the value present in the table which is smaller than and nearest to the design value or the measured value of the torque constant or the voltage constant of the motor may be used as the change rate of the torque constant or the voltage constant of the motor for which the absolute value of the acceleration in deceleration to be used is obtained. For example, in TABLE 3, when the torque constant or the voltage constant of the motor is the measured value, 60 m/s$^2$ may be used as the absolute value of the acceleration in deceleration for −10% of the change rate of the torque constant or voltage constant of the motor. When using the upper limit, the value present in the table which is larger than and nearest to the design value or the measured value of the torque constant or the voltage constant of the motor may be used as the change rate of the torque constant or the voltage constant of the motor for which the absolute value of the acceleration in deceleration to be used is obtained. For example, in TABLE 4, when the torque constant or the voltage constant of the motor is the design value, 45 m/s$^2$ may be used as the absolute value of the acceleration in deceleration for 5% of the change rate of the torque constant or voltage constant of the motor.

Figure 24:
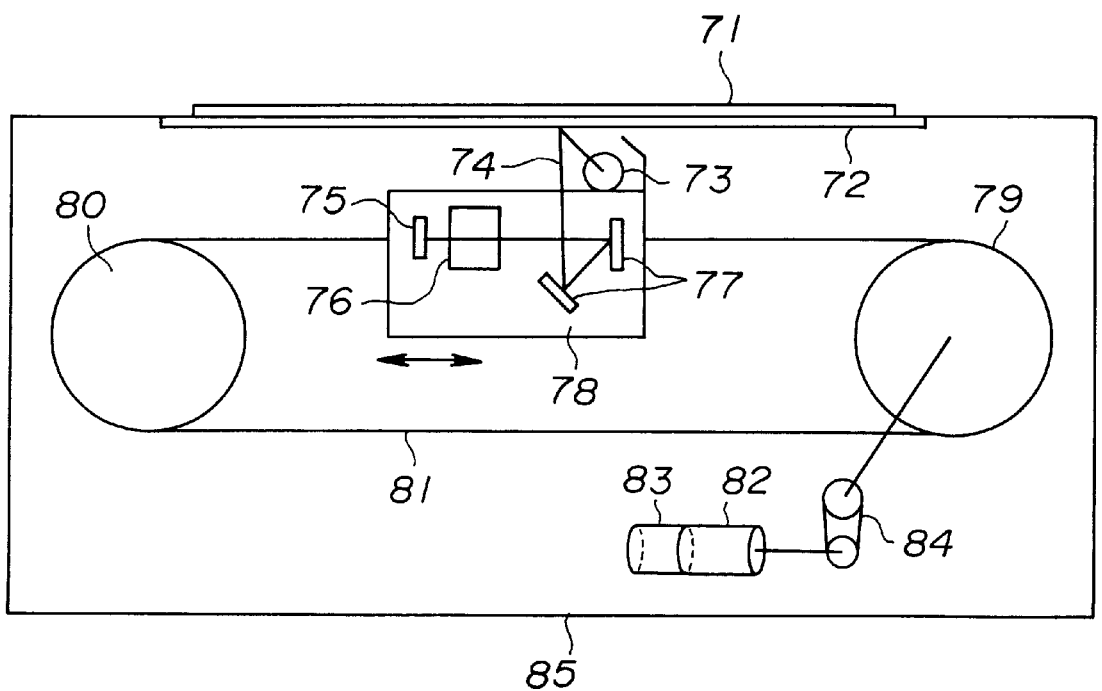
FIG. 24 shows an internal side elevational view of an example of an image reading apparatus, in a tenth embodiment of the present invention, which may use the motor control device in any one of the second embodiment, variant of the second embodiment, third embodiment, fourth embodiment, fifth embodiment, sixth embodiment, eighth embodiment, and ninth embodiment of the present invention.

FIG. 24 shows an internal side elevational view of an example of an image reading apparatus, in a tenth embodiment of the present invention, which may use the motor control device in the second embodiment or that in the variant of the second embodiment. In FIG. 24, the image reading apparatus includes an original image sheet table 72, on which an original image sheet 71 is placed and an original image sheet lighting system 73. The original image sheet lighting system 73 emits light to the original image sheet, which reflects the light. The reflected light has the optical axis 74. The image reading apparatus also includes a reading device (for example, a CCD) 75, an image forming lens 76 and reflecting mirrors 77. A light-to-electricity converting unit 78 includes the CCD 75, lens 76, mirrors 77 and so forth. The image reading apparatus also includes sub-scan driving pulleys 79, 80, a wire 81, and a driving motor 82. Coaxially with the motor 82, a velocity detecting rotary encoder 83 is provided. A power transmission system 84 transmits rotation of the motor 82 to the pulley 79. The image reading apparatus is covered by a housing 85. The driving motor 82 is fixed to the housing 85. The light-to-electricity converting unit 78 is driven in the sub-scan direction by the driving motor 82 through means for transmitting driving power of the motor 82 such as the wire 81, pulleys 79, 80, power transmission system 84 such as gears, and so forth. At this time, the original image sheet lighting system 73 such as a fluorescent lamp lights the original image sheet 71 on the original image sheet table 72. The bundle of rays reflected by the original image sheet 71 (having the optical axis 74) is reflected by a plurality of mirrors 77, and is incident onto the CCD (image sensor) 75 via the image forming lens 76. Thus, an image of the original image sheet 71 is formed on the light receiving portion of the CCD 75. At this time, the entire original image sheet 71 is read by sub-scanning of the light-to-electricity converting unit 78 through the motor 82, velocity detecting rotary encoder 83, and so forth, and main scanning of the light-to-electricity converting device 78 itself.

The return control of such an image reading apparatus is equivalent to the motor rotation control. Merely, a rotation angle of the motor is converted into a sub-scan position of the moving unit (the light-to-electricity converting unit 78 in FIG. 24) as a result of certain coefficients of a power transmission system and sub-scan driving pulleys being multiplied. A rotation angle and rotation angular velocity of the motor 111 are replaced by a moving unit target position and velocity as a result of multiplying the above-mentioned certain coefficients. As a result, the second embodiment and the variant of the second embodiment can be applied to the return control of the image reading apparatus. In the above-described methods in the third, fourth, fifth, sixth, seventh, eighth and ninth embodiments, the absolute value of acceleration in deceleration is the absolute value of acceleration in deceleration of the moving unit. Therefore, each of the methods in the third, fourth, fifth, sixth, seventh, eighth and ninth embodiments, can be applied to the return control of the image reading apparatus. Thereby, high-speed, stable return control can be achieved. In the example of FIG. 24, the entire optical system is mounted on the one moving unit and the moving unit is driven. An image reading apparatus to which the present invention is applied is not limited to this type. The present invention can be also applied to another type of image reading apparatus in which two moving units are driven at velocities of the ratio of 2:1, respectively. Further, as the optical system, a same-size imaging unit can be used.

Thus, in the tenth embodiment of the present invention, by using the motor control device in any of the second embodiment and the variant of the second embodiment, or by using any of the methods in the third, fourth, fifth, sixth, seventh, eighth and ninth embodiments, as the return control of the sub-scan moving unit of the image reading apparatus, it is possible to produce the moving unit driving device of the image reading apparatus which can perform high-speed, precise and stable return control.

Figure 25:
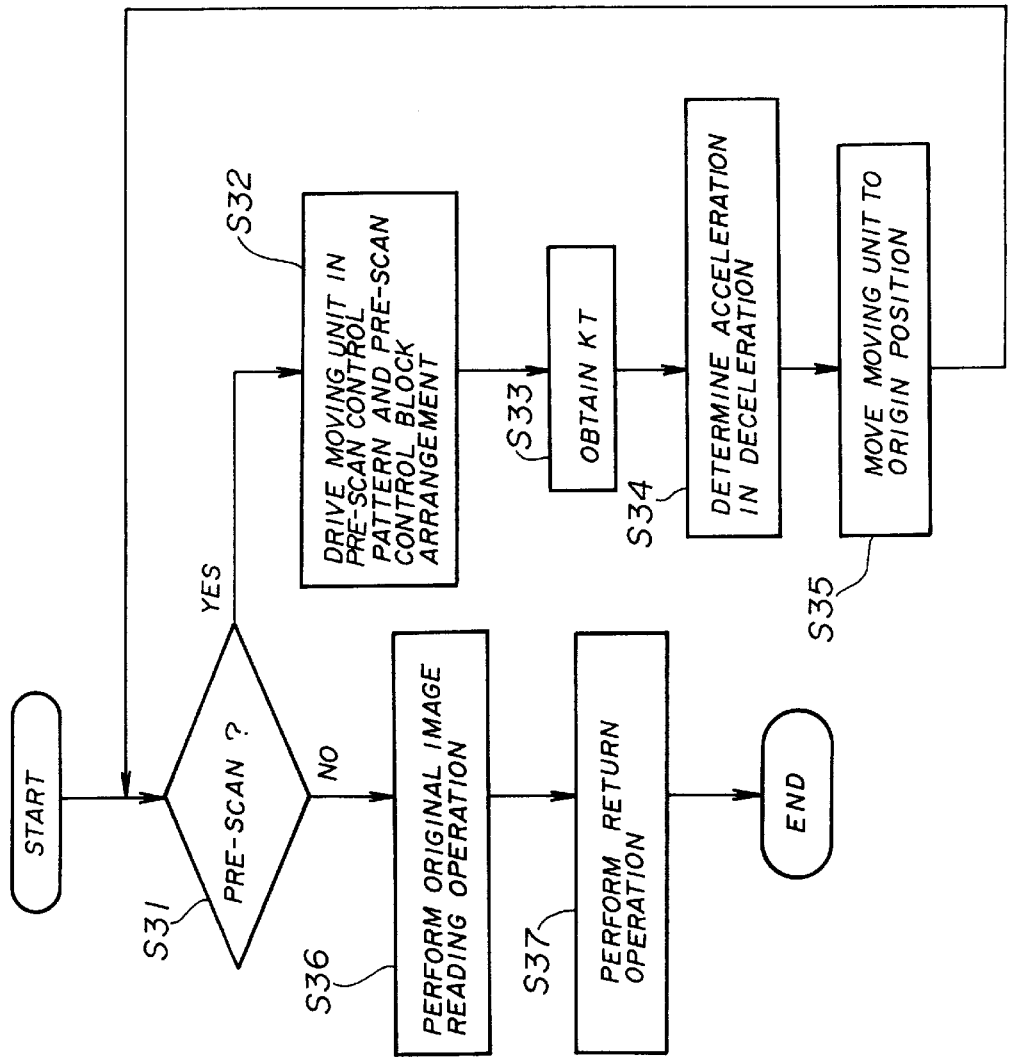
FIG. 25 shows an operation flowchart of image reading in an eleventh embodiment of the present invention.

FIG. 25 shows an operation flowchart of image reading in an eleventh embodiment of the present invention. When a start button or the like is pressed and image reading of an image reading apparatus starts, it is determined in S31 whether or not a pre-scan mode is selected. In the image reading apparatus, a button or a signal for previously setting whether or not a pre-scan is performed before image reading may be provided. According to this setting, S31 is performed. When it is determined in S31 that the pre-scan mode is selected, the moving unit is driven in a pre-scan control pattern and a pre-scan control block arrangement in S32. In S33, the torque constant KT of the motor is obtained (as described later). In S34, acceleration in deceleration is determined in the methods of the eighth embodiment and ninth embodiment for the obtained torque constant KT. The moving unit is moved to the origin position for image reading in S35. Thus, the pre-scan mode is finished. Then, in S31, it is determined again whether or not the pre-scan mode is selected. When it is determined in S31 that the pre-scan mode is not selected, that is, an image reading mode is selected, an original image reading operation is performed in S36. After the original image has been read, the return operation is performed in S37 using the acceleration of deceleration determined in S34. Thus, the image reading operation is finished. Because the acceleration in deceleration in the return operation is determined based on the torque constant KT which is obtained in the pre-scan mode immediately before the image reading operation, even if the torque constant KT of the motor has changed, it is possible to always perform the return operation precisely.

Figure 26:
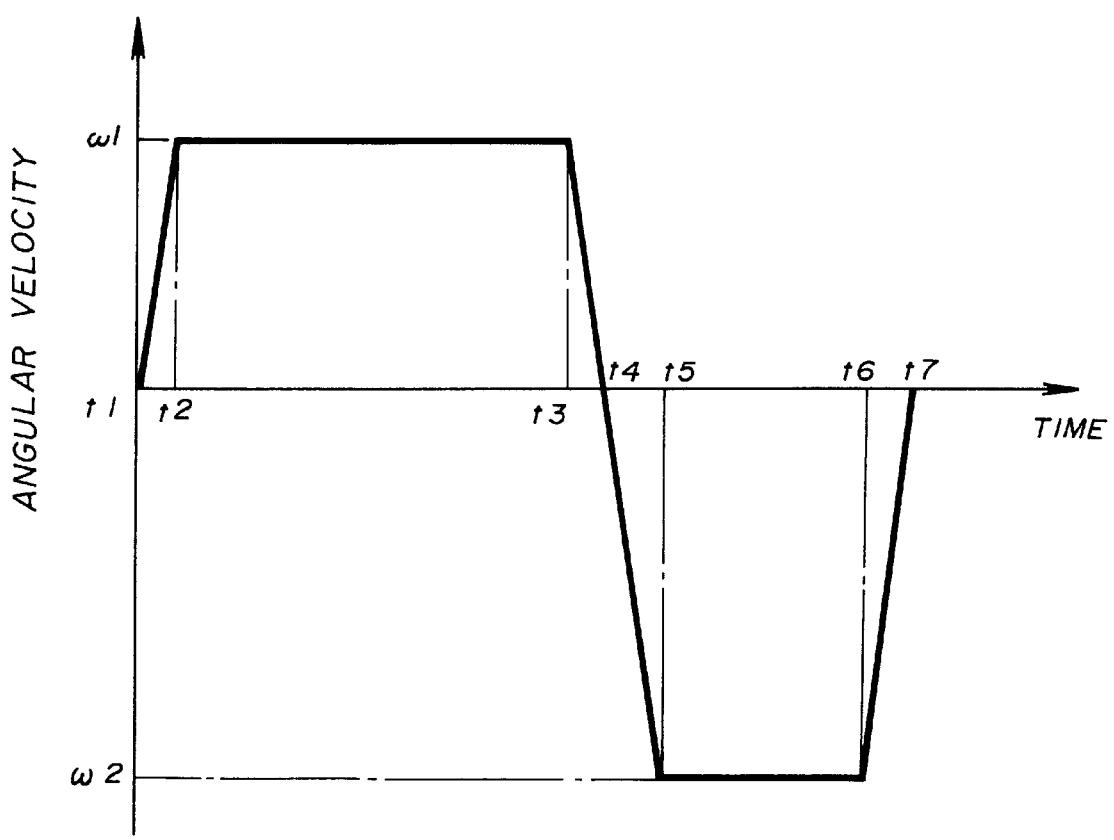
FIG. 26 shows a pre-scan control pattern.
Figure 27:
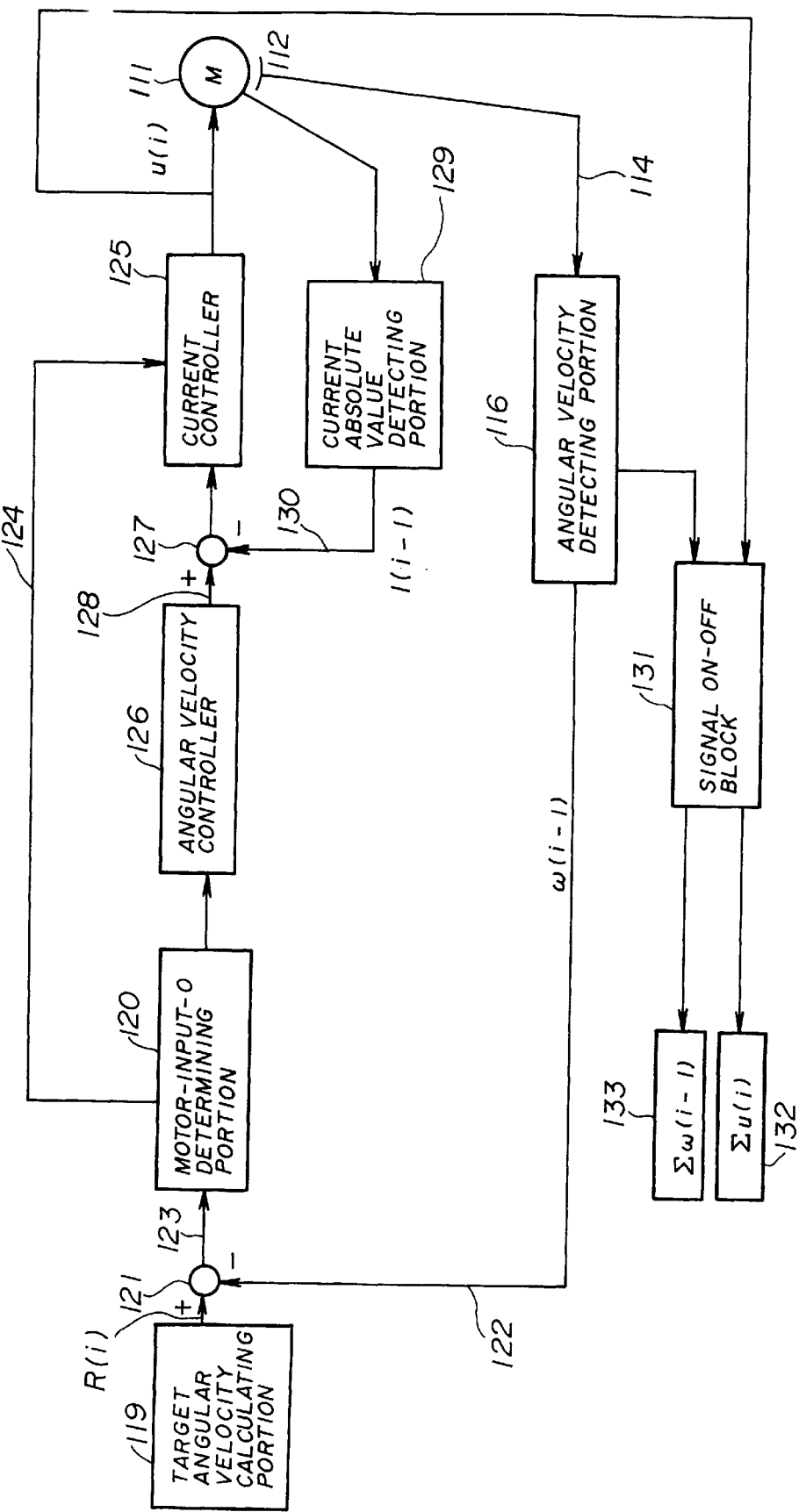
FIG. 27 shows a pre-scan control block arrangement.

With reference to FIGS. 26 and 27, the pre-scan control pattern and pre-scan control block arrangement mentioned in S32 will now be described.

FIG. 26 shows the pre-scan control pattern. In FIG. 26, not target angular velocity but actual angular velocity are indicated. FIG. 27 shows the pre-scan control block arrangement for achieving the pre-scan control pattern.

In the pre-scan, the motor is controlled so that the target angular velocity is ω1 from the time t1 to the time t3 in the image reading direction. Then, the motor is controlled so that the target angular velocity is ω2 from the time t3 to the time t6 in the return direction. Then, the motor is stopped and the motor completely stops at the time t7. FIG. 26 shows the actual angular velocity when the motor is driven for the target angular velocity.

Although the motor is controlled so that the target angular velocity is ω1 from the time t1, a time is required for the actual angular velocity to rise. At the time t2, the angular velocity reaches ω1. Then, until the time t3, the motor is controlled so that the angular velocity is ω1. Similarly, although the motor is controlled so that the target angular velocity is ω2 in the return direction from the time t3, a time is required for the actual angular velocity to decay. At the time t4, the angular velocity is 0 instantaneously, and then, at the time t5, the angular velocity reaches ω2. Then, until the time t6, the motor is controlled so that the angular velocity is ω2.

FIG. 27 shows a block diagram of a control system for a pre-scan. A signal detected by a rotary encoder 112 provided to a motor 111 is given to an angular velocity detecting portion 116 via a feedback path 114. A target angular velocity calculating portion 119 gives a target angular velocity R(i) in the above-described pre-scan operation to an operation portion 121. An angular velocity ω(i−1) detected by the angular velocity detecting portion 116 is input to the operation portion 121 via a feedback path 122. The operation portion 121 obtains the difference between R(i) and ω(i−1), and provides the difference to a motor-input-0 determining portion 120 via a path 123. The motor-input-0 determining portion 120 uses the time having elapsed from the control start and the sign of the value given via the path 123 (details will be described later), and thus, determines whether a motor input is to be 0 or not. When the motor-input-0 determining portion 120 determines that 0 is given as the motor input, the motor-input-0 determining portion 120 provides a signal indicating this determination result to a current controller 125 via a path 124. When the motor-input-0 determining portion 120 determines that the motor input is not to be 0, the motor-input-0 determining portion 120 provides the output of the operation portion 121, as it is, to an angular velocity controller 126. The angular velocity controller 126 is, for example, a controller such as that performing a proportional-control (P-control) operation, and provides the result of the operation to an operation portion 127 via a path 128.

The absolute value of the current flowing through the motor 111 is detected by a current absolute value detecting portion 129 and is provided to the operation portion 127 via a path 130. The operation portion 127 obtains the difference between the signal via the path 128 and the signal via the path 130, and provides the difference to the current controller 125. The current controller 125 includes a controller which performs, for example, a proportional-and-integral control (PI-control) operation, and a forcible-0-output portion. The current controller 125 determines whether the controller (for example, of PI-control) or the forcible-0-output portion is used. When the signal indicating that 0 is given as the motor input is given to the current controller 125 via the path 124, the current controller 125 outputs 0 to the motor 111 as an output signal u(i). When the signal indicating that 0 is given as the motor input is not given to the current controller 125, the current controller 125 gives the operation result of the operation portion 127 to the motor 111. By repeating the above-described loop operations, it is possible to stably control the motor 111 based on a given angular velocity graph.

As shown in the figure, the output signal u(i) from the current controller 125 to the motor 111 and the angular velocity detected by the angular velocity detecting portion 116 are input to a signal on-off block 131. The signal on-off block 131 turns on at the time t2 and at the time t5 when the actual angular velocity reach the target angular velocity, respectively, and velocity constant control starts. The signal on-off block 131 turns off at the time t3 and at the time t6 when the velocity constant control finishes. Only during the time when the signal on-off block 131 is on, the output signal u(i) from the current controller 125 to the motor 111 and the angular velocity detected by the angular velocity detecting portion 116 are output to blocks 132 and 133. Each of the blocks 132 and 133 integrates the given signal. After the pre-scan has finished, immediately each of the integrated values of the block 132 and 133 is divided by the integral total number. Thus, the average of each of the output signal from the current controller 125 to the motor 111 and the angular velocity is calculated. Signal integration is performed for each target angular velocity. As a result, the average $u\omega 1$ of the output signal from the current controller 125 to the motor 111 and the average $V\omega 1$ of the angular velocity for the target angular velocity $\omega 1$ are obtained. Also, the average $u\omega 2$ of the output signal from the current controller 125 to the motor 111 and the average $V\omega 2$ of the angular velocity for the target angular velocity $\omega 2$ are obtained.

Operations of the motor-input-0 determining portion 120 during pre-scan will now be described. From t1 to t3, when the result of subtracting the detected angular velocity $\omega(i-1)$ from the target velocity R(i) is negative, that is, the signal on the path 123 is negative, it is determined that 0 is given as a motor input, and a signal indicating this determination result is given to the current controller 125 via the path 124. When the result of subtracting the detected angular velocity $\omega(i-1)$ from the target velocity R(i) is not negative, that is, the signal on the path 123 is not negative, the value on the path 123 is, as it is, output to the angular velocity controller 126. From t3 to t6, when the result of subtracting the detected angular velocity $\omega(i-1)$ from the target velocity R(i) is positive, that is, the signal on the path 123 is positive, it is determined that 0 is given as a motor input, and a signal indicating this determination result is given to the current controller 125 via the path 124. When the result of subtracting the detected angular velocity $\omega(i-1)$ from the target velocity R(i) is not positive, that is, the signal on the path 123 is not positive, the value on the path 123 is, as it is, output to the angular velocity controller 126.

Obtaining of KT in S33 of FIG. 25 will now be described.

As described above, the average $u\omega 1$ of the output signal from the current controller 125 to the motor 111 and the average $V\omega 1$ of the angular velocity for the target angular velocity $\omega 1$ are obtained. Also, the average $u\omega 2$ of the output signal from the current controller 125 to the motor 111 and the average $V\omega 2$ of the angular velocity for the target angular velocity $\omega 2$ are obtained. The torque constant, that is, the voltage constant of the motor KT is obtained from the following equation:

$$KT=(u\omega 2 - u\omega 1)/(V\omega 2 - V\omega 1).$$

This calculation is easily performed by previously programing this equation in the microcomputer.

Thus, in the eleventh embodiment, each of the motor control devices, in which acceleration in deceleration of the moving unit is determined in the methods of the eighth embodiment and ninth embodiment, is used for the return control of the sub-scan moving unit of the image reading apparatus. By performing a pre-scan in the image reading apparatus and thereby obtaining the torque constant or the voltage constant of the motor, it is possible to provide the moving unit driving device of the image reading apparatus in which high-speed, precise and stable return control following change of the torque constant or the voltage constant of the motor can be performed.

Figure 28:
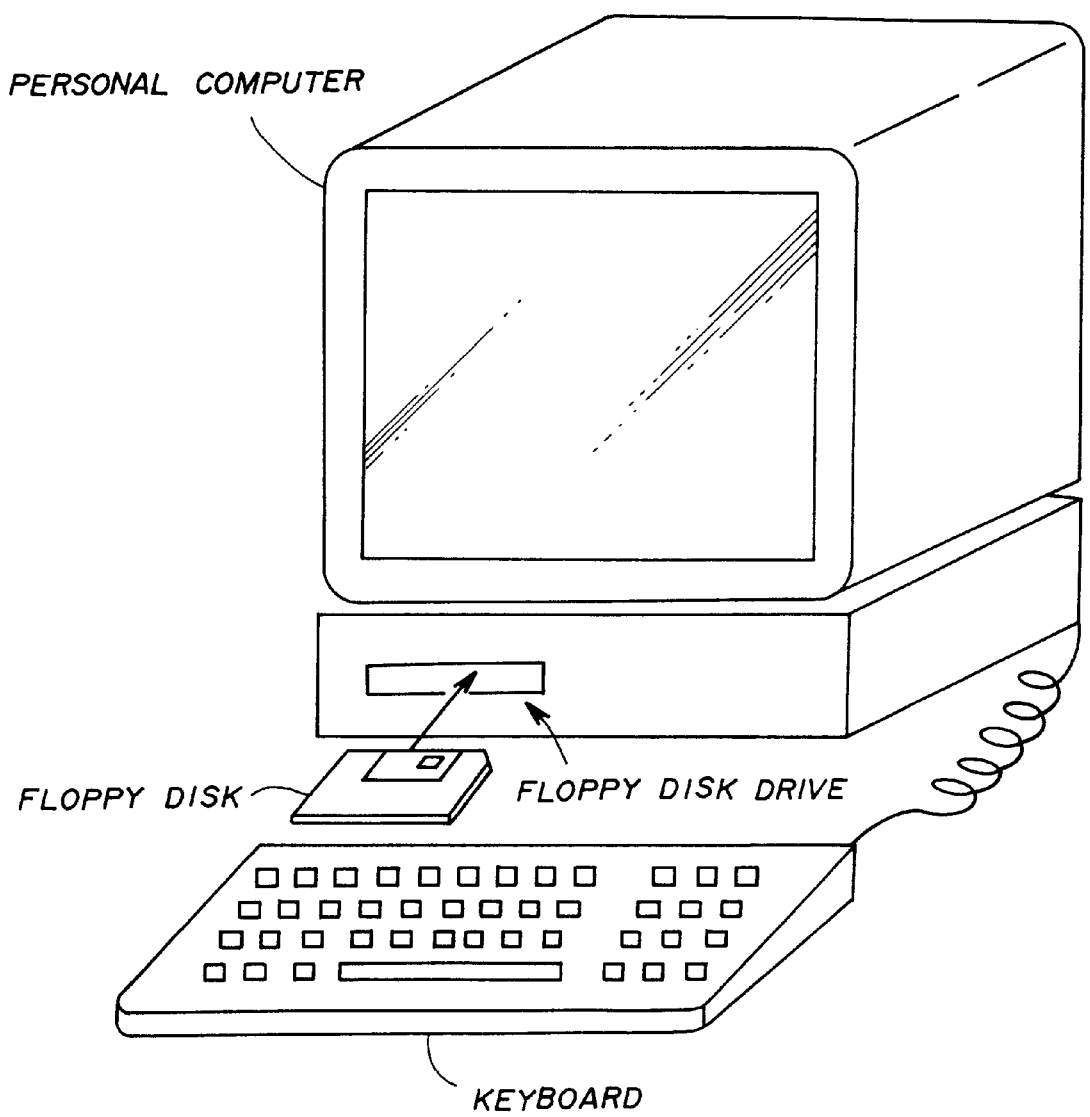
FIG. 28 shows a personal computer which can be used in the present invention.

As shown in FIG. 28, a general-purpose computer such as a personal computer shown in FIG. 28 can be used for performing above-described functions of each of the first embodiment, second embodiment, variant of the second embodiment, third embodiment, fourth embodiment, fifth embodiment, sixth embodiment, seventh embodiment, eighth embodiment, ninth embodiment, tenth embodiment and eleventh embodiment. The general-purpose computer is specifically configured by software (stored in any information storage medium such as a floppy disk shown in FIG. 28) executed thereby to carry out the above-described functions.

Further, the present invention is not limited to the above-described embodiments, and variations and modifications may be made without departing from the scope of the present invention claimed in the following claims.

What is claimed is:

1. A control method of a scanner optical system of an original image reading apparatus, said apparatus comprising an exposure optical system including a scanner optical system which can perform go and return operations, a scanner driving motor which drives said scanner optical system, velocity detecting means for detecting a moving velocity of said scanner optical system and position detecting means for detecting the position of said scanner optical system, said method comprising the step of return control which is control of returning said scanner optical system after an original image reading scan has been finished, said step of return control comprising the steps of:

calculating target velocity from a residual distance from a current position of said scanner optical system to a target reference position;

using target acceleration as feedforward;

performing velocity control so that detected velocity follows the target velocity;

recognizing a moving distance from information including an original image sheet size and copy magnification;

obtaining the maximum velocity from acceleration determined from the moving distance and a mechanical performance of a scanner optical system driving system, and from a reference position plunge velocity; and calculating acceleration, a constant velocity state and deceleration switching over positions.

2. The control method according to claim 1, wherein said maximum velocity is a predetermined rate of a calculated maximum velocity which is calculated from the acceleration determined from the moving distance and mechanical performance, and the reference position plunge velocity.

3. A control method of a scanner optical system of an original image reading apparatus, said apparatus comprising an exposure optical system including a scanner optical system which can perform go and return operations, a scanner driving motor which drives said scanner optical system, velocity detecting means for detecting a moving velocity of said scanner optical system and position detecting means for detecting the position of said scanner optical system, said method comprising the step of return control which is control of returning said scanner optical system after an original image reading scan has been finished, said step of return control comprising the steps of:

calculating target velocity from a residual distance from a current position of said scanner optical system to a target reference position;

using target acceleration as feedforward; and performing velocity control so that detected velocity follows the target velocity, wherein the absolute value of acceleration in deceleration in the return control is switched over to a smaller value at a predetermined position near to a stop position.

4. A control method of a scanner optical system of an original image reading apparatus, said apparatus comprising an exposure optical system including a scanner optical system which can perform go and return operations, a scanner driving motor which drives said scanner optical system, velocity detecting means for detecting a moving velocity of said scanner optical system and position detecting means for detecting the position of said scanner optical system, said method comprising the step of return control which is control of returning said scanner optical system after an original image reading scan has been finished, said step of return control comprising the steps of:

calculating target velocity from a residual distance from a current position of said scanner optical system to a target reference position;

using target acceleration as feedforward; and performing velocity control so that detected velocity follows the target velocity, wherein a friction force occurring from the construction of a scanner optical system driving system is converted into acceleration which is added to the target acceleration of the feedforward.

5. A motor control device, which is a motor driving control device for controlling motor angular velocity in trapezoid driving for rotating a motor a predetermined angle, wherein:

a target angular velocity $\omega$ in deceleration is $\sqrt{2\alpha\Theta}$ where $\Theta$ represents the rotation angle until the motor stops and $\alpha$ represents the absolute value of acceleration in deceleration, said motor control device is a motor control device of a current driving system in which a current flowing through the motor is controlled, only the absolute value of the current flowing through the motor is detected, and a current feedback loop is formed, sequential control of motor rotation angle according to the trapezoid driving is performed, in deceleration, when actual angular velocity is lower than target angular velocity, a motor input voltage is to be 0, and in a velocity constant state or in acceleration and the velocity constant state, when actual angular velocity is higher than target angular velocity, a motor input voltage is to be 0.

6. The motor control device according to claim 5, wherein:

a graph is produced in which one axis represents acceleration in deceleration and the other axis represents errors with respect to a design value of the torque constant or the voltage constant of a motor, and the trapezoid control possible range is obtained in said graph, and acceleration in deceleration is obtained for which the entirety of a given error range with respect to the design value of the torque constant or the voltage constant of the motor is included in said trapezoid control possible range, the obtained acceleration in deceleration being actually used.

7. The motor control device according to claim 6, wherein said given error range with respect to the design value of the torque constant or the voltage constant of the motor is 0%.

8. The motor control device according to claim 5, wherein:

a graph is produced in which one axis represents acceleration in deceleration and the other axis represents errors with respect to a design value of the torque constant or the voltage constant of a motor, and the trapezoid control possible range is obtained in said graph, previously the torque constant or the voltage constant of the motor is measured, and acceleration in deceleration is obtained for which the entirety of a given error range with respect to the measured value of the torque constant or the voltage constant of the motor is included in said trapezoid control possible range, the obtained acceleration in deceleration being actually used.

9. The motor control device according to claim 8, wherein said given error range with respect to the measured value of the torque constant or the voltage constant of the motor is 0%.

10. The motor control device according to claim 5, wherein:

a graph is produced in which one axis represents acceleration in deceleration and the other axis represents errors with respect to a design value of the torque constant or the voltage constant of a motor, and the lower limit or the upper limit of the trapezoid control possible range is obtained in said graph, and acceleration in deceleration for the design value of the torque constant or the voltage constant of the motor is obtained based on the line of said lower limit or upper limit, and the obtained acceleration in deceleration is actually used.

11. The motor control device according to claim 10, wherein said lower limit or upper limit is stored as a table.

12. The motor control device according to claim 5, wherein:

a graph is produced in which one axis represents acceleration in deceleration and the other axis represents errors with respect to a design value of the torque constant or the voltage constant of a motor, and the lower limit or the upper limit of the trapezoid control possible range is obtained in said graph, previously the torque constant or the voltage constant of the motor is measured, and acceleration in deceleration for the measured value of the torque constant or the voltage constant of the motor is obtained based on the line of said lower limit or upper limit, and the obtained acceleration in deceleration is actually used.

13. The motor control device according to claim 12, wherein said lower limit or upper limit is stored as a table.

14. A moving unit driving device of an image reading apparatus, said device using, for return control of a sub-scan moving unit of said image reading apparatus, a motor control device, which is a motor driving control device for controlling motor angular velocity in trapezoid driving for rotating the motor a predetermined angle, wherein:

target angular velocity $\omega$ in deceleration is $\sqrt{2\alpha\Theta}$ where $\Theta$ represents the rotation angle until the motor stops and $\alpha$ represents the absolute value of acceleration in deceleration, said motor control device is a motor control device of a current driving system in which a current flowing through the motor is controlled, only the absolute value of the current flowing through the motor is detected, and a current feedback loop is formed, sequential control of motor rotation angle according to the trapezoid driving is performed, in deceleration, when actual angular velocity is lower than target angular velocity, a motor input voltage is to be 0, and in a velocity constant state or in acceleration and the velocity constant state, when actual angular velocity is higher than target angular velocity, a motor input voltage is to be 0.

15. A moving unit driving device of an image reading apparatus, said device using, for return control of a sub-scan moving unit of said image reading apparatus, a motor control device, wherein:

a graph is produced in which one axis represents acceleration in deceleration and the other axis represents errors with respect to a design value of the torque constant or the voltage constant of a motor, and the lower limit or the upper limit of the trapezoid control possible range is obtained in said graph, previously the torque constant or the voltage constant of the motor is obtained in a pre-scan of said image reading apparatus, and acceleration in deceleration for the measured value of the torque constant or the voltage constant of the motor is obtained based on the line of said lower limit or upper limit, and the obtained acceleration in deceleration is actually used.

16. A computer program product for a motor control device, which is a motor driving control device for controlling motor angular velocity in trapezoid driving for rotating a motor a predetermined angle, said computer program product comprising a computer usable medium having computer readable program code means embodied in said medium, said computer readable program code means comprising:

first program code means for obtaining a target angular velocity in deceleration $\omega=\sqrt{2\alpha\Theta}$ where $\Theta$ represents the rotation angle until the motor stops and $\alpha$ represents the absolute value of acceleration in deceleration, second program code means for controlling a current flowing through the motor, said motor control device being a motor control device of a current driving system in which a current flowing through the motor is controlled, only the absolute value of the current flowing through the motor is detected, and a current feedback loop is formed, third program code means for performing sequential control of a motor rotation angle according to the trapezoid driving, fourth program code means for causing a motor input voltage to be 0, in deceleration, when actual angular velocity is lower than target angular velocity, and fifth program code means for causing a motor input voltage to be 0, in a velocity constant state or in acceleration and the velocity constant state, when actual angular velocity is higher than target angular velocity.

* * * * *